(12) United States Patent
Bhavaraju

(10) Patent No.: US 10,355,305 B2
(45) Date of Patent: Jul. 16, 2019

(54) ALKALI METAL INTERCALATION MATERIAL AS AN ELECTRODE IN AN ELECTROLYTIC CELL

(71) Applicant: FIELD UPGRADING LIMITED, Calgary (CA)

(72) Inventor: Sai Bhavaraju, West Jordan, UT (US)

(73) Assignee: ENLIGHTEN INNOVATIONS INC., Calgary (CA)

( * ) Notice: Subject to any disclaimer, the term of this patent is extended or adjusted under 35 U.S.C. 154(b) by 0 days.

(21) Appl. No.: 14/196,893

(22) Filed: Mar. 4, 2014

(65) Prior Publication Data

US 2014/0199577 A1    Jul. 17, 2014

Related U.S. Application Data

(63) Continuation-in-part of application No. 13/742,184, filed on Jan. 15, 2013, now Pat. No. 9,797,053.
(Continued)

(51) Int. Cl.
| | |
|---|---|
| *H01M 10/052* | (2010.01) |
| *H01M 10/054* | (2010.01) |
| *C25B 13/04* | (2006.01) |
| *C25C 7/04* | (2006.01) |
| *H01M 10/0562* | (2010.01) |
| *H01M 6/18* | (2006.01) |
| *H01M 8/1016* | (2016.01) |

(52) U.S. Cl.
CPC .......... *H01M 10/052* (2013.01); *C25B 13/04* (2013.01); *C25C 7/04* (2013.01); *H01M 6/185* (2013.01); *H01M 10/054* (2013.01); *H01M 10/0562* (2013.01); *H01M 8/1016* (2013.01)

(58) Field of Classification Search
CPC .......................... H01M 10/052; H01M 10/054
USPC .................................. 429/101–105, 321–323
See application file for complete search history.

(56) References Cited

U.S. PATENT DOCUMENTS

| | | |
|---|---|---|
| 4,026,725 A | 5/1977 | Sutula |
| 4,213,833 A | 7/1980 | Lefevre |
| (Continued) | | |

FOREIGN PATENT DOCUMENTS

| | | | | |
|---|---|---|---|---|
| JP | H04132174 | * | 5/1992 | ............ H01M 10/40 |
| JP | 2005-063958 | * | 3/2005 | ............ H01M 10/38 |
| (Continued) | | | | |

OTHER PUBLICATIONS

Shin, Ju C., "International Search Report", *PCT Application PCT/US2014/020392 (Corresponding to U.S. Appl. No. 14/196,893,* (dated Jul. 1, 2014),1-4.
(Continued)

*Primary Examiner* — Osei K Amponsah
(74) *Attorney, Agent, or Firm* — Foley & Lardner LLP

(57) ABSTRACT

The present invention provides an electrochemical cell that includes an anolyte compartment housing an anode electrode; a catholyte compartment housing a cathode electrode; and a solid alkali ion conductive electrolyte membrane separating the anolyte compartment from the cathode compartment. In some cases, the electrolyte membrane is selected from a sodium ion conductive electrolyte membrane and a lithium ion conductive membrane. In some cases, the at least one of anode or the cathode includes an alkali metal intercalation material.

17 Claims, 13 Drawing Sheets

Related U.S. Application Data

(60) Provisional application No. 61/772,356, filed on Mar. 4, 2013, provisional application No. 61/772,306, filed on Mar. 4, 2013, provisional application No. 61/587,044, filed on Jan. 16, 2012.

(56) References Cited

U.S. PATENT DOCUMENTS

| | | | |
|---|---|---|---|
| 5,290,405 A | 3/1994 | Joshi et al. | |
| 5,580,430 A | 12/1996 | Balagopal et al. | |
| 5,968,326 A | 10/1999 | Yelon et al. | |
| 6,770,187 B1* | 8/2004 | Putter | C25C 1/02 |
| | | | 204/252 |
| 6,949,285 B1 | 9/2005 | Tobinaga et al. | |
| 7,618,527 B2 | 11/2009 | Schussler et al. | |
| 8,038,865 B2 | 10/2011 | Schussler | |
| 2003/0224244 A1* | 12/2003 | Inda | H01M 2/162 |
| | | | 429/126 |
| 2004/0191617 A1 | 9/2004 | Visco et al. | |
| 2006/0226022 A1 | 10/2006 | Balagopal et al. | |
| 2007/0172739 A1 | 7/2007 | Visco et al. | |
| 2007/0202400 A1* | 8/2007 | Yoshida | H01M 10/0562 |
| | | | 429/203 |
| 2007/0202414 A1* | 8/2007 | Yoshida | H01M 4/5825 |
| | | | 429/304 |
| 2008/0118826 A1* | 5/2008 | Shimamura | H01M 6/48 |
| | | | 429/129 |
| 2008/0311480 A1* | 12/2008 | Sano | H01M 4/13 |
| | | | 429/322 |
| 2009/0136830 A1* | 5/2009 | Gordon | H01M 10/052 |
| | | | 429/50 |
| 2009/0189567 A1 | 7/2009 | Joshi et al. | |
| 2010/0068629 A1 | 3/2010 | Gordon | |
| 2010/0099029 A1* | 4/2010 | Kinoshita | H01M 4/134 |
| | | | 429/316 |
| 2011/0039162 A1 | 2/2011 | Maeda | |
| 2011/0065006 A1* | 3/2011 | Ogasa | H01M 4/0471 |
| | | | 429/319 |
| 2012/0052382 A1 | 3/2012 | Yoshida et al. | |
| 2012/0085658 A1 | 4/2012 | Bhavaraju et al. | |
| 2012/0171562 A1 | 7/2012 | Narula et al. | |
| 2012/0175267 A1 | 7/2012 | Bhavaraju et al. | |
| 2012/0208062 A1 | 8/2012 | Zhou et al. | |
| 2012/0219833 A1* | 8/2012 | Coors | H01B 1/122 |
| | | | 429/50 |
| 2012/0251871 A1 | 10/2012 | Suzuki et al. | |
| 2013/0004852 A1 | 1/2013 | Visco et al. | |
| 2014/0065492 A1* | 3/2014 | Komaba | H01M 4/134 |
| | | | 429/337 |

FOREIGN PATENT DOCUMENTS

| | | |
|---|---|---|
| JP | 2005-166325 | 6/2005 |
| JP | 2007-524204 A | 8/2007 |
| JP | 2009-181920 | 8/2009 |
| JP | 2009-301727 | 12/2009 |
| JP | 2010-176941 | 8/2010 |
| JP | 2010-287414 | 12/2010 |
| JP | 2011-228162 | 11/2011 |
| WO | WO-96/27697 A1 | 9/1996 |
| WO | WO-2005/083829 A2 | 9/2005 |
| WO | WO-2010/073978 | 1/2010 |
| WO | WO-2013/109542 | 7/2013 |
| WO | WO2013109542 | 7/2013 |

OTHER PUBLICATIONS

Shin, Ju Cheol "Written Opinion of the International Searching Authority", *PCT Application No. PCT/US2014/020392 (Corresponding to U.S. Appl. No. 14/196,893)*, (dated Jul. 1, 2014),1-6.
Boussard, Nadege , "European Search Report", European Patent Application No. 14760372.4, dated Sep. 29, 2016, 1-7.
Bommaraju et al., "Brine Electrolysis", Electrochemistry Encyclopedia, (Nov. 2001), (13 pages).
European Search Report for EP Pat. Appl. No. 13738140.6, dated Jul. 24, 2015 (6 pages).
European Search Report; EP Pat Application No. 14760372.4 dated Sep. 29, 2016 (7 pages).
Final Office Action dated Apr. 22, 2016 for U.S. Appl. No. 13/742,184.
International Search Report in PCT/US2013/021587 dated Apr. 29, 2013.
Non-final Office Action dated Dec. 22, 2016 for U.S. Appl. No. 13/742,184 (12 pages).
Supplementary European Search Report and Written Opinion for EP Appl 14760372.4 dated Oct. 7, 2016.
Supplementary European Search Report in EP 13738140 dated Nov. 19, 2015.
U.S Office Action dated Oct. 22, 2015 for U.S. Appl. No. 13/742,184.
Second Office Action in JP2015-561558 dated Jul. 17, 2018, with English translation (15 pages).

* cited by examiner

ALKALI METAL INTERCALATION MATERIAL AS AN ELECTRODE IN AN ELECTROLYTIC CELL

CROSS-REFERENCE TO RELATED APPLICATIONS

This application claims the benefit of U.S. Provisional Application No. 61/772,356, filed Mar. 4, 2013, entitled "Alkali Metal Intercalation Material as an Electrode in an Electrolytic Cell"; U.S. Provisional Application No. 61/772,306, filed Mar. 4, 2013, entitled "Alkali Metal Intercalation Material as an Electrode in a Secondary Battery"; and U.S. patent application Ser. No. 13/742,184, filed Jan. 15, 2013, entitled Composite Solid Electrolyte for Electrolysis of Acid Anolyte, which application claimed priority to U.S. Provisional Application No. 61/587,044 filed on Jan. 16, 2012, the entire disclosures of such applications are hereby incorporated by reference.

FIELD OF THE INVENTION

The present invention relates in general to electrolytic cells. More particularly, the present invention provides an electrolytic cell that includes a solid alkali ion conductive electrolyte membrane and at least one electrode that includes an alkali metal intercalation material. In some instances, the intercalation material includes an alkali metal selected from sodium and lithium.

BACKGROUND OF THE INVENTION

Electrolytic cells comprising solid alkali ion conductive electrolyte membranes that selectively transport alkali ions are known in the art. By having an alkali ion selective membrane in an electrolytic cell, alkali ions are allowed to pass between the cell's anolyte compartment and catholyte compartment while other chemicals are maintained in their original compartments. Thus, through the use of an alkali ion specific membrane, an electrolytic cell can be engineered to be more efficient and to produce different chemical reactions than would otherwise occur without the membrane.

Solid alkali ion conductive electrolyte membranes are used in electrochemical cells for various reasons, including, but not limited to, for being ion conductive, ion selective, water impermeable, chemically stable, electronically insulating, and for similar reasons. By way of example, NaSICON (Na Super Ion CONducting) membranes selectively transport sodium cations, while LiSICON (Li Super Ion CONducting) membranes selectively transport lithium cations. Other examples of solid alkali ion conductive electrolyte membranes include beta alumina, sodium-conductive glasses, etc.

Electrolytic cells comprising solid alkali ion conductive membranes are used to produce a wide variety of different chemicals and to perform various chemical processes. In some cases, such electrolytic cells convert alkali salts into their corresponding acids. In other cases, such electrolytic cells may also be used to separate alkali metals from mixed alkali salts. Accordingly, some such electrolytic cells can be used to purify metals, such as sodium, lithium, potassium.

Despite their utility, electrolytic cells comprising solid alkali ion conductive membranes are not necessarily without their shortcomings or challenges. For example, some such electrolytic cells are relatively inefficient. More particularly, some such cells are subject to a relatively high amount of voltage drop between and anode electrode and cathode electrode. Moreover, as some such electrolytic cells can generate low pH acids in the electrolyte compartment and/or high pH bases in the catholyte compartment as the cells function, the contents of such cells can degrade or damage the solid alkali ion conductive membrane, thereby, causing the cell to become less efficient or even inoperable.

Thus, while electrolytic cells comprising a catholyte compartment and an anolyte compartment that are separated by a solid alkali ion-conductive membrane are known, challenges still exist. Accordingly, it would be an improvement in the art to augment or even replace certain conventional electrolytic cells with other electrolytic cells.

BRIEF SUMMARY OF THE INVENTION

The present invention generally relates generally to an electrolytic cell that includes a solid alkali ion conductive electrolyte membrane and at least one electrode that includes an alkali metal intercalation material. While the cell can have any suitable component, in some non-limiting implementations, the cell includes an anolyte compartment housing an anode electrode; a catholyte compartment housing a cathode electrode; and a solid sodium or lithium ion conductive electrolyte membrane separating the anolyte compartment and the catholyte compartment. In the cell, at least one of anode or the cathode includes an alkali metal intercalation material, which, in turn, includes an alkali metal (e.g., sodium or lithium) that is intercalated into and/or onto a base material (e.g., carbon, nickel oxide, manganese oxide, iron phosphate, etc.).

In other non-limiting implementations, the invention relates to an electrochemical cell that includes an anolyte compartment housing an anode electrode, wherein the anode comprises a sodium metal intercalation material; a catholyte compartment housing a cathode electrode; and a solid, sodium ion conductive electrolyte membrane positioned between the anolyte compartment and the catholyte compartment, wherein the anode is coupled to or disposed on the electrolyte membrane.

In one embodiment, the present invention is in the form of a secondary cell (or rechargeable battery). It will be appreciated by those of skill in the art that rechargeable batteries are often referred to as having positive and negative electrodes. As used herein throughout, "negative electrode" may be used interchangeable with "anode", "positive electrode" may be used interchangeably with "cathode", "negative electrode compartment" may be used interchangeably with "anolyte", and "positive electrode compartment" may be used interchangeably with "catholyte".

The secondary based secondary cell may include a solid alkali metal ion conductive electrolyte membrane and a negative electrode (or anode) that includes an alkali metal intercalation material. Although the described secondary cell can include any suitable component, in some non-limiting implementations, the cell includes an anolyte compartment housing the negative electrode; a catholyte compartment housing a positive electrode (or cathode); and a solid, sodium or lithium metal ion conductive electrolyte membrane that separates the negative electrode from the positive electrode. While the positive electrode in such implementations can include any suitable material that can function as a positive electrode (e.g., $Ni(OH)_2$, NiOOH, etc.), in some cases, the positive electrode optionally includes a second alkali metal intercalation material, which is different (e.g., has a different potential) from the first intercalation material, and which is coupled to a second side of the electrolyte membrane. Although the negative electrode can include any suitable alkali metal intercalation material, in some cases, it includes $M_xC_6$, wherein M is Na or Li. Similarly, where the positive electrode includes an intercalation material, the positive electrode can include any suitable alkali metal intercalation material that is different (e.g., in potential) from the intercalation material of the negative electrode. In some cases, by way of example, it includes $M_xNiO$, $M_xMnO_2$, or $M_xFe_y(PO_4)_z$, where M is Na or Li, and where $0.2 \leq x \leq 1$.

In some non-limiting implementations, the described cell includes an anolyte compartment housing a negative electrode, wherein the negative electrode includes a first alkali metal intercalation material. In such implementations, the cell also includes a catholyte compartment comprising a positive electrode, wherein the positive electrode includes a second alkali metal intercalation material that is different from the first alkali metal intercalation material. Moreover, in such implementations, the cell includes a solid alkali metal ion conductive electrolyte membrane that separates the negative electrode from the positive electrode, wherein the first and the second alkali metal intercalation materials are in direct contact with the electrolyte membrane, and wherein electrolyte membrane is selected from a sodium ion conductive electrolyte membrane and a lithium ion conductive membrane.

In still other non-limiting implementations, the cell includes an anolyte compartment housing a negative electrode, wherein the negative electrode comprises a first sodium intercalation material (e.g., $Na_xC_6$, wherein x is between about 1 and about 3). In such implementations, the cell further includes a catholyte compartment housing a positive electrode, wherein the positive electrode includes a second sodium intercalation material that has a different electrical potential than the first sodium intercalation material. Moreover, in such implementations, the cell includes a solid sodium ion conductive electrolyte membrane that separates the negative electrode from the positive electrode, wherein the first and the second sodium intercalation materials are in direct contact with the electrolyte membrane.

In still other non-limiting implementations, the described invention relates to a solid alkali metal ion conductive electrolyte membrane that includes a first surface and a second surface (which is substantially opposite to the first surface), wherein the electrolyte membrane is selected from a sodium ion conductive electrolyte membrane and a lithium ion conductive membrane. In such implementations, a negative electrode, which includes a first alkali metal intercalation material, is attached to the first surface.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings (and the various portions thereof) are not made to scale, depict only some representative embodiments of the invention, and are not therefore to be considered to be limiting of its scope, the invention will be described and explained with additional specificity and detail through the use of the accompanying drawings in which:

Figure 10:
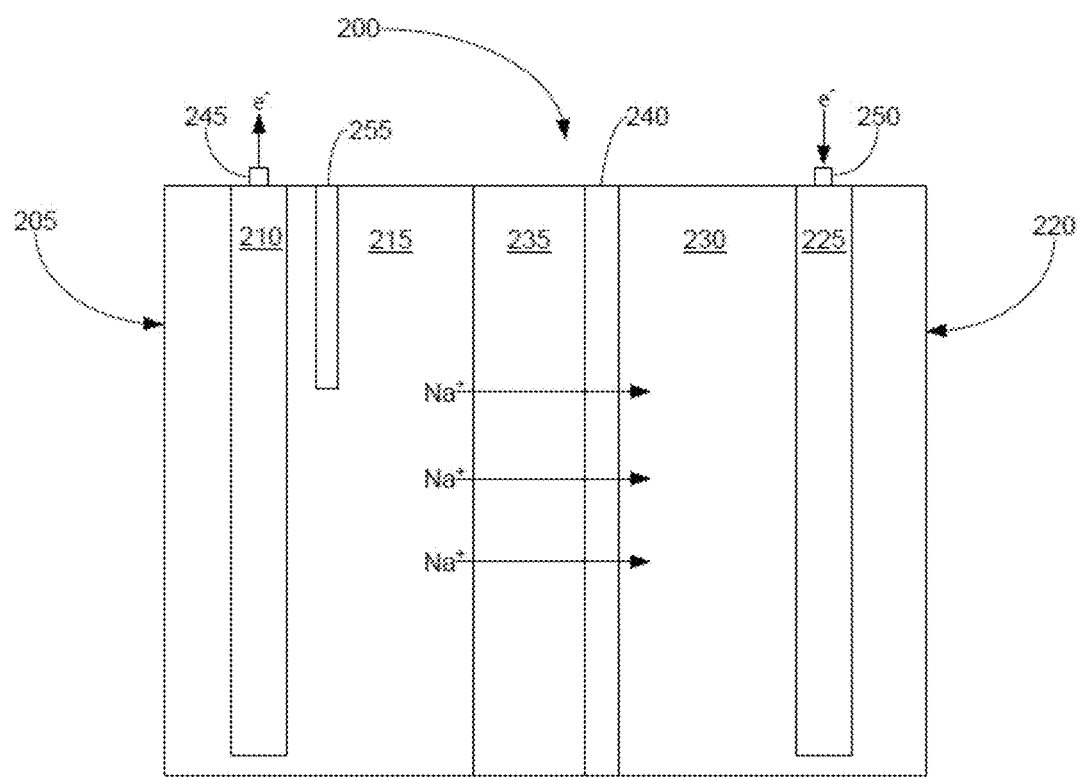
FIG. 10 depicts a schematic diagram of a representative embodiment of a secondary cell comprising a negative electrode and a positive electrode that are separated from the electrolyte membrane, and wherein electrolyte membrane includes a carbon coating.
Figure 12:
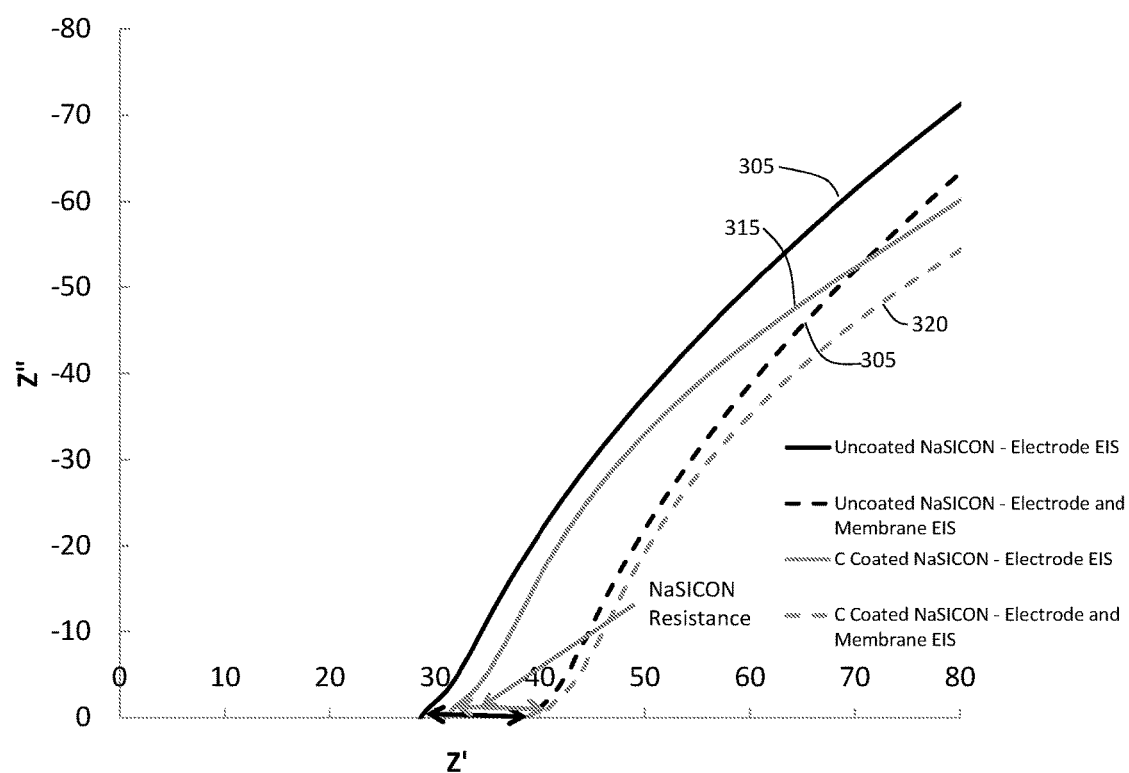
Figure 13:
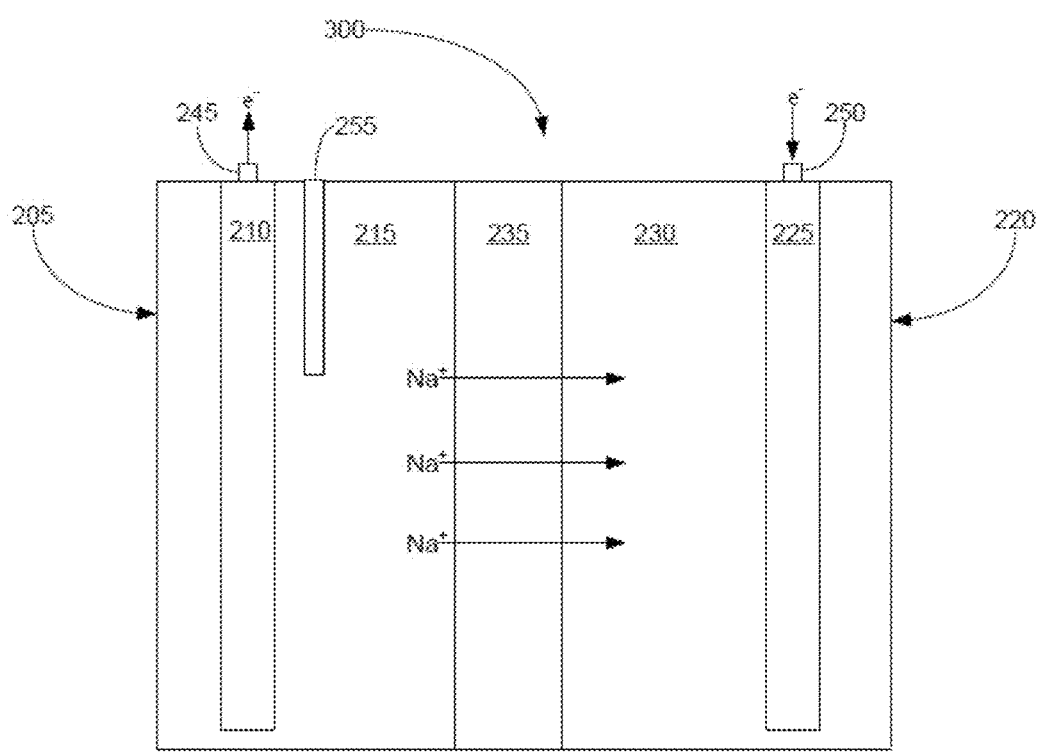

FIG. 12 depicts a graph illustrating that the presence of the carbon coating on the NaSICON membrane does not increase NaSICON resistance; and FIG. 13 depicts a schematic diagram of a representative embodiment of an experimental electrolytic cell, wherein the negative electrode and the positive electrode in the cell are separated from the electrolyte membrane, and wherein the electrolyte membrane does not include the carbon coating of the cell in FIG. 10.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," "another embodiment," and similar language throughout this specification may, but do not necessarily, all refer to the same embodiment. Additionally, while the following description refers to several embodiments, implementations, and examples of the various components and aspects of the described invention, all of the described embodiments, implementations, and examples are to be considered, in all respects, as illustrative only and not as being limiting in any manner.

Furthermore, the described features, structures, or characteristics of the invention may be combined in any suitable manner in one or more embodiments. In the following description, numerous specific details are provided, such as examples of suitable anode electrodes, cathode electrodes, alkali metal intercalation materials, alkali ion conductive electrolyte membranes, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
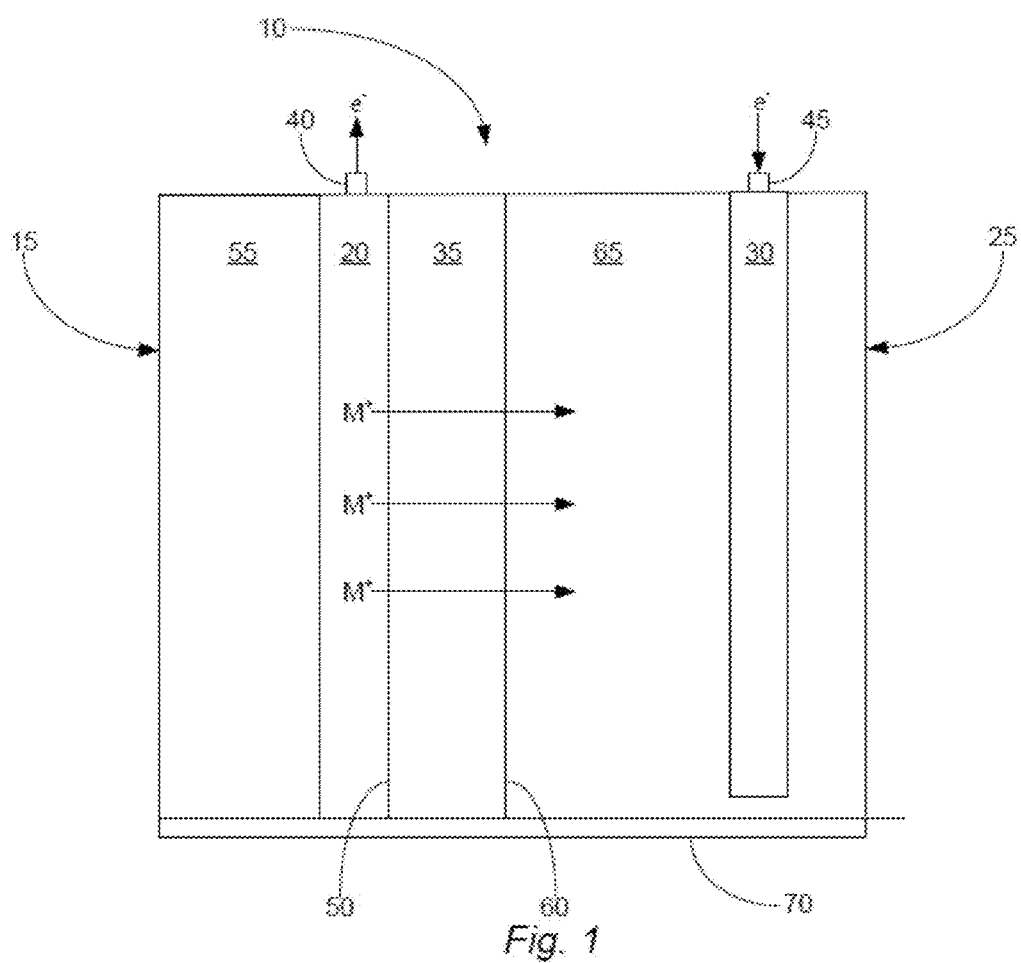
FIG. 1 depicts a schematic diagram of a representative embodiment of an electrolytic cell, wherein the cell comprises an anode electrode that is disposed on a solid alkali ion conductive electrolyte membrane.

Some embodiments of the present invention provide an electrolytic cell that includes a solid alkali ion conductive electrolyte membrane and at least one electrode that includes an alkali metal intercalation material. While the described cell can comprise any suitable component, FIG. 1 shows a representative embodiment in which the electrolytic cell 10 comprises an anolyte compartment 15, which includes an anode electrode 20; a catholyte compartment 25, which comprises a cathode electrode 30; an alkali ion conductive electrolyte membrane 35 that separates the anolyte compartment 15 from the catholyte compartment 25; a first terminal 40; and a second terminal 45. To provide a better understanding of the described cell, a brief description of each of the cell's components shown in FIG. 1 is discussed below in more detail.

With regard to the anolyte 15 and catholyte 25 compartments, such compartments can be any suitable shape and have any other suitable characteristic that allows the cell 10 to function as intended. By way of example, the anolyte compartment and the catholyte compartment can each be tubular, rectangular, irregular, or can be any other suitable shape. Furthermore, the two compartments can have any suitable spatial relationship with respect to each other. For instance, while FIG. 1 shows an embodiment in which the anolyte compartment 15 and the catholyte compartment 25 are adjacent to each other, in other embodiments (not shown), one compartment (e.g., the anolyte compartment) is disposed (at least partially) within the other compartment (e.g., the catholyte compartment), while the contents of the two compartments remain separated by the alkali ion conductive electrolyte membrane 35 and any other compartmental walls.

With respect to the anode 20, the cell 10 can comprise any suitable anode that allows the cell to function as intended (e.g., carry out any desired electrochemical reaction). Some examples of suitable anode materials include, but are not limited to, an alkali metal intercalation material, current collector metal (e.g., copper, aluminum, etc.), dimensionally stabilized anode-platinum on titanium (DSA), platinized titanium, ruthenium (IV) dioxide ($RuO_2$), tungsten, carbon, and/or other suitable known or novel anode materials. In some embodiments, however, the anode comprises an alkali metal intercalation material.

Where the anode 20 comprises an intercalation material, the intercalation material can comprise any alkali metal containing material that allows the cell to function and that also allows alkali metal (e.g., Na or Li) in the anode to be oxidized to form alkali ions ($Na^+$ or $Li^+$) as the cell is operates. Furthermore, in some embodiments, the intercalation material comprises a material that causes little to no increase in the resistance of the electrolyte membrane 35 (discussed below). In other words, in some embodiments, the intercalation material readily transports alkali ions there through and has little to no adverse effect on the rate at which alkali ions pass from the anolyte compartment 15 to the catholyte compartment 25.

In some embodiments in which the anode 20 comprises an intercalation material, the intercalation material comprises sodium metal intercalated with a base material, such as carbon (e.g., graphite, mesoporous carbon, boron-doped diamond, carbon, and/or graphene), nickel oxide, manganese oxide, iron phosphate, etc. Indeed, in some embodiments, the anode 20 comprises $Na_xC_6$ (wherein x is between about 0 and about 3), $Na_xNiO$, $Na_xMnO_2$, $Na_xNiO_2$, $Na_xAlO_2$, $Na_xCoO_2$, (wherein x is between about 0.2 and about 1), and/or $Na_xFe_y(PO_4)_z$, (wherein x is between about 0 and about 3, y is about 1, and z is between about 1 and about 3).

In other embodiments, the intercalation material in the anode 20 comprises a lithium metal intercalated into and/or onto a base material, such as carbon (e.g., graphite, mesoporous carbon, boron-doped diamond, carbon, and/or graphene), nickel oxide, manganese oxide, iron phosphate, etc. Indeed, in some embodiments, the anode 20 comprises $Li_xC_6$ (wherein x is between about 0 and about 3), $Li_xNiO$, $Li_xMnO_2$, $Li_xCoO_2$, $Li_xMn_2O_4$ (wherein x is between about 0.2 and about 1), and/or $Li_xFe_y(PO_4)_z$ (wherein x is between about 0 and about 1, y is about 1, and z is between about 1 and about 1). Moreover, while the anode can have any suitable configuration, in some embodiments, the anode comprises a coating, wire, felt, plate, tube, mesh, foam, and/or other suitable anode configuration.

While the anode 20 can have any spatial relationship with respect to the alkali ion conductive electrolyte membrane 35 (discussed below), in some embodiments (as shown in FIG. 1), the anode 20 is coupled to or disposed on a first side 50 of the membrane 35 that faces the anolyte compartment 15. While having the intercalation material of the anode be disposed on the electrolyte membrane (e.g., as a coating) may provide the cell 10 with several features, in some embodiments, by having the intercalation material be disposed on the electrolyte membrane, alkali ions (e.g., $Na^+$ or $Li^+$) can pass directly from the anode and through the electrolyte membrane (e.g., as the current is passed between the anode and cathode 30) and into the catholyte compartment 25.

Figure 2:
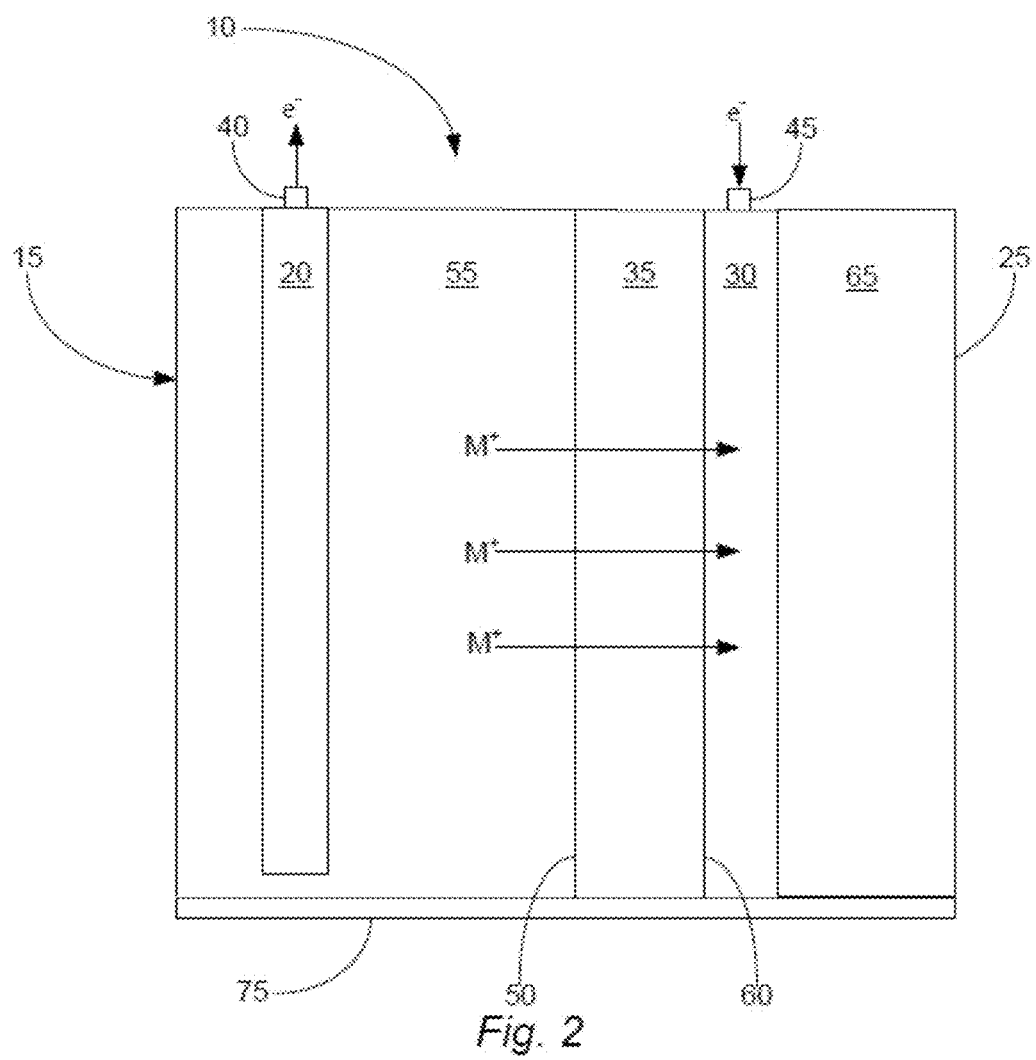
FIG. 2 depicts a schematic diagram of a representative embodiment of the cell, wherein the anode is separated from the electrolyte membrane.

In other embodiments, however, FIG. 2 shows some embodiments in which the anode 20 is separated from the electrolyte membrane 35. In some such embodiments, when the anode is separated from the electrolyte membrane, the intercalation material optionally makes up most, if not all, of the material used to make the anode. In some other embodiments, the anode comprises a substrate (e.g., a carbon substrate, a wire, mesh, a plate, foam, tungsten, etc.) that is at least partially coated with the intercalation material.

Where the anode 20 comprises the intercalation material, the intercalation material can be coupled to the electrolyte membrane 35 (as shown in FIG. 1) or be disposed on, coupled to, or otherwise be formed as part of the anode (as shown in FIG. 2) in any suitable manner. Indeed, in some embodiments, the intercalation material of the anode 20 is disposed on the electrolyte membrane and/or anode (e.g., an anode substrate) through a method such as chemical vapor deposition ("CVD"), physical vapor deposition ("PVD"), sputtering, casting, pulsed laser deposition, DC magnetron sputtering, molding, extrusion, and/or any other suitable technique that is either capable of disposing the intercalation material of the anode on the electrolyte membrane or that is otherwise capable of forming the anode. Additionally, while the intercalation material can be added to a substrate (e.g., the first side 50 of the electrolyte membrane 35, the anode 20, and/or an anode substrate) as a single layer, in some embodiments, 1, 2, 3, 4, 5, 6, 7, 8, 9, 10, or more layers of the intercalation material are added to the substrate to form the anode.

Although, in some embodiments, the intercalation material of the anode 20 comprises an alkali metal (e.g., Na or Li) when the anode is formed (e.g., when the intercalation material is disposed on the electrolyte membrane 35, an anode substrate, etc.), in other embodiments, the base material (e.g., carbon, nickel oxide, manganese oxide, iron phosphate, etc.) of the intercalation material is first coated on the substrate (e.g., electrolyte membrane, an anode substrate, etc.) and the alkali metal is then loaded into the base material. While this loading can be accomplished in any suitable manner, in some embodiments, the loading is accomplished before the intercalation material is added to the cell 10 and/or as the cell functions.

Where the anode 20 comprises an intercalation material and the intercalation material is coated on a substrate (e.g., the first side 50 of the electrolyte membrane 35 as shown in FIG. 1), an anode 20 that is separate from the electrolyte membrane (as shown in FIG. 2), etc.), the intercalation material (as a whole) can be any suitable thickness that allows the cell 10 to function. Indeed, in some embodiments, the intercalation material of the anode is as thin as a measurement selected from about 50 μm, about 25 μm, about 10 μm, about 5 μm, and about 1 μm. In some embodiments, however, the intercalation material of the anode is as thick as a measurement selected from about 55 μm, about 100 μm, about 500 μm, about 1 mm, about 5 mm, and about 1 cm. In still other embodiments, the thickness of the intercalation material of the anode is between any suitable combination or sub-range of the aforementioned measurements (e.g., between about 250 μm and about 520 μm).

In addition to the anode 20, in some embodiments, the anolyte compartment 15 comprises an anolyte solution 55 (as shown in FIGS. 1 and 2). In this regard, the anolyte solution can comprise any suitable chemical or chemicals that allow the cell 10 to function and to carry out a desired chemical reaction. Some examples of suitable anolyte solutions include, but are not limited to, aqueous and/or non-aqueous solutions comprising water, formamide, methyl formamide, dimethyl formamide, acetamide, fluoroacetamide, methyl acetamide, 1,2-propanediol, ethylene glycol, 1,3-propylene glycol, $Na_2SO_4$, $NaNO_3$, $Li_2SO_4$, $LiNO_3$, NaI, $Na_2S$, NaCl, LiI, $Li_2S$, and/or LiCl. Indeed, in some embodiments in which the electrolyte membrane 35 is configured to selectively transport sodium ions, the anolyte solution comprises an aqueous solution of NaI, $Na_2S$, NaCl, $Na_2SO_4$, and $NaNO_3$. In contrast, in some embodiments in which the electrolyte membrane is configured to selectively transport lithium ions, the anolyte solution comprises an aqueous solution of LiI, $Li_2S$, or LiCl.

Turning now to the solid alkali ion selective electrolyte membrane 35, the cell 10 can comprise any solid alkali ion selective electrolyte membrane that allows the cell to effectuate a desired electrochemical reaction. In this regard, the alkali ion conductive electrolyte membrane 35 material may include, but is not limited to, a β''-alumina ceramic electrolyte separator, and an alkali Metal Super Ion Conductive (MeSICON) material, where "Me" represents an alkali metal. Some examples of MeSICON materials include, but are not limited to, ceramic NaSICON type materials (including, without limitation, any suitable known or novel NaSICON material) and LiSICON type materials (including, without limitation, any suitable known or novel LiSICON material). In some embodiments in which the anode 20 comprises an intercalation material that contains sodium (e.g., $Na_xC_6$, where x is between about 0 and about 3), the electrolyte membrane comprises a NaSICON type material. In contrast, in some embodiments in which the anode comprises an intercalation material that contains lithium (e.g., $Li_xC_6$), the electrolyte membrane comprises a LiSICON type material.

With regards now to the cathode electrode 30, the cell 10 can comprise any suitable cathode 30 material that allows the cell to carry out any desired chemical reaction. Some examples of suitable cathode materials include, but are not limited to, a second alkali metal intercalation material that is disposed on a second side 60 (as shown in FIG. 2) of the electrolyte membrane 35, nickel, stainless steel alloys, graphite, carbon, titanium, a nickel cobalt ferrous alloy (e.g., a KOVAR® alloy), an electro-catalyst (e.g., platinum), a molten metal (e.g., molten sodium), other known or novel cathode materials, and combinations thereof. In some embodiments, however, the cathode comprises an alkali metal intercalation material.

In embodiments in which the cathode 30 comprises an alkali metal intercalation material, the cathode can comprise any suitable intercalation material that allows the cell 10 to function. In some embodiments in which the electrolyte membrane 35 is selective to sodium ions (e.g., comprises a NaSICON type material), the intercalation material used in the cathode 30 comprises sodium intercalated with a base material, such as carbon (e.g., graphite, mesoporous carbon, boron-doped diamond, carbon, and/or graphene), nickel oxide, manganese oxide, iron phosphate, etc. In this regard, some examples of suitable sodium intercalation materials that can be used in the cathode include, but are not limited to, $Na_xNiO$, $Na_xMnO_2$, $Na_xNiO_2$, $Na_xAlO_2$, $Na_xCoO_2$ (wherein x is between about 0.2 and about 1) and/or $Na_xFe_y(PO_4)_z$, (wherein x is between about 0 and about 3, y is about 1, and z is between about 1 and about 3).

In some embodiments in which the electrolyte membrane 35 selectively transports lithium (e.g., comprises a LiSICON type material), the cathode 30 comprises a lithium intercalation material. Indeed, in some embodiments in which the electrolyte membrane comprises a lithium selective material, the cathode comprises $Li_xNiO$, $Li_xMnO_2$, $Li_xCoO_2$, $Li_xMn_2O_4$ (wherein x is between about 0.2 and about 1), and/or $Li_xFe_y(PO_4)_z$ (wherein x is between about 0 and about 3, y is about 1, and z is between about 1 and about 3).

Figure 3:
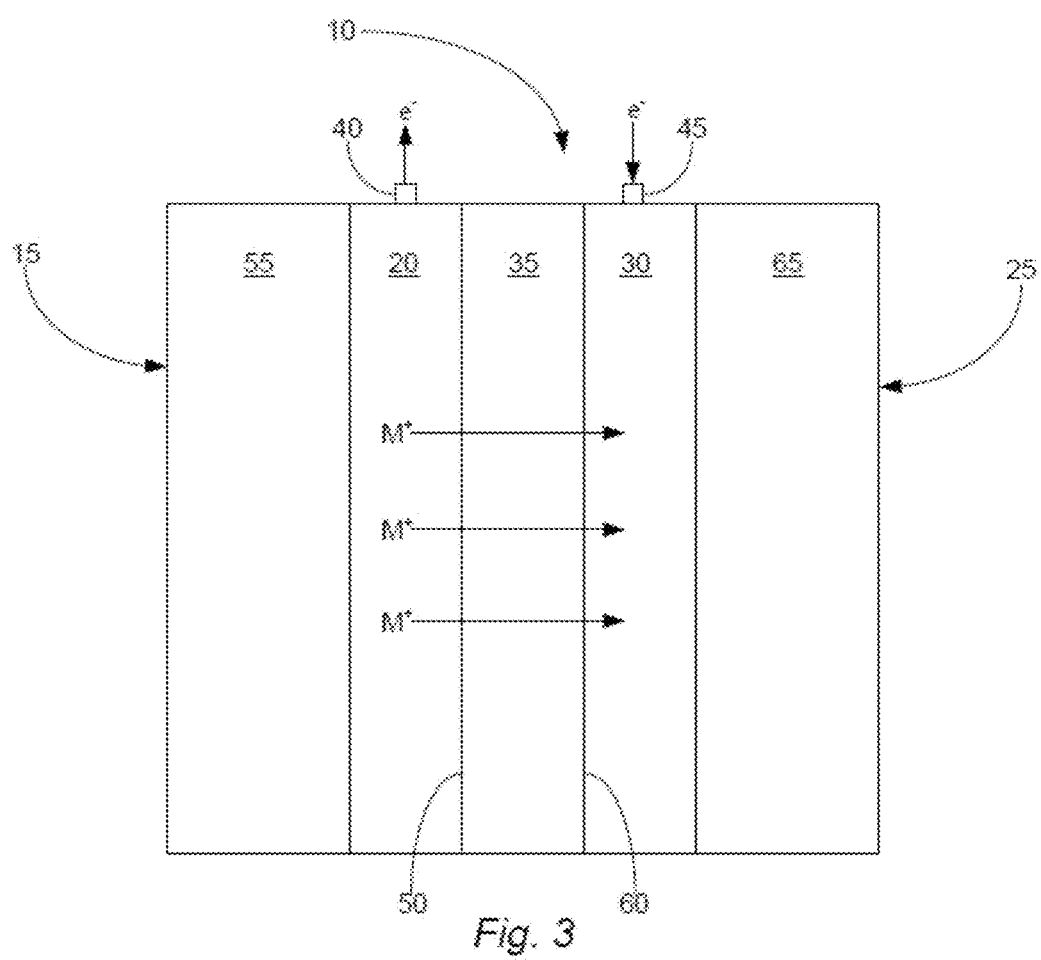
FIG. 3 depicts a schematic diagram of a representative embodiment of the cell, wherein the anode and a cathode electrode are each disposed on an opposing surface of the electrolyte membrane.
Figure 4:
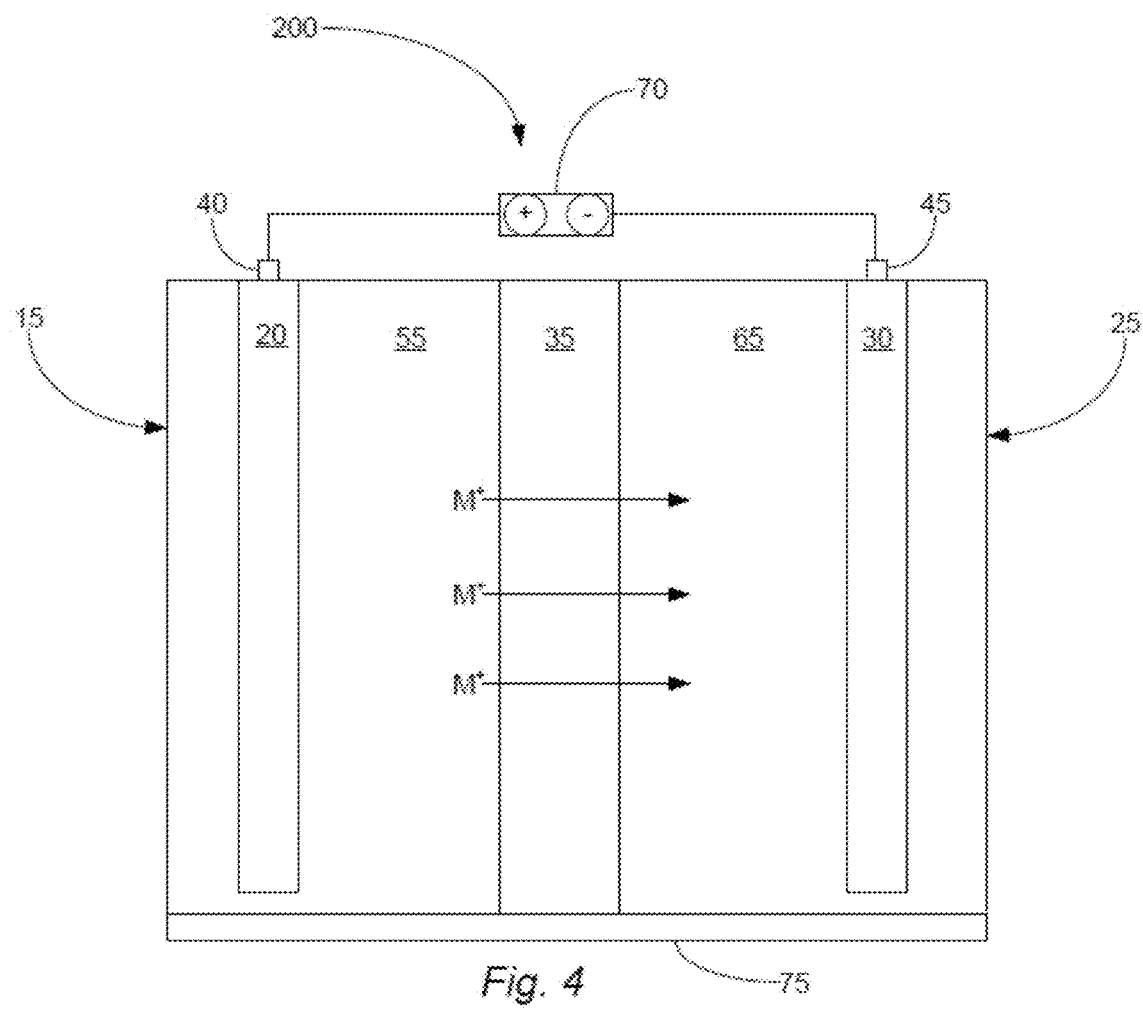
FIG. 4 depicts a schematic diagram of a representative embodiment of the cell, wherein the anode and cathode are each disposed separate from the electrolyte membrane.

While the cathode 30 can have any spatial relationship with respect to the alkali ion conductive electrolyte membrane 35, in some embodiments (as shown in FIG. 3), the cathode 30 is coupled to a second side 60 of the membrane 35 that faces the catholyte compartment 15. In such embodiments, the position of the cathode may provide the cell 10 with several benefits, which may include, without limitation, an efficient way to operate the cell with a relatively small amount of voltage drop between the anode 20 and the cathode. In other embodiments (as shown in FIG. 4), the cathode 30 is separated from the electrolyte membrane 35. In some embodiments, when the cathode is separated from the electrolyte membrane, the intercalation material makes up most if not all of the material used to make the cathode.

In some other embodiments, the cathode comprises a substrate (e.g., a carbon substrate, a wire, mesh, a plate, foam, etc.) that is at least partially coated with the intercalation material.

Where the cathode 30 comprises the alkali metal intercalation material, the intercalation material can be disposed on the electrolyte membrane 35 (as shown in FIG. 3); or coupled to, disposed on, or otherwise formed as part of the cathode (as shown in FIG. 4) in any suitable manner. Indeed, in some embodiments, the intercalation material of the cathode 20 is disposed on a substrate (e.g., the second side 60 of the electrolyte membrane, a cathode substrate (e.g., a carbon substrate, a wire, mesh, a plate, foam, etc.), through one or more of the methods that are discussed above for forming and/or disposing the intercalation material for the anode 20 (e.g., CVD, PVD, sputtering, casting, etc.). Moreover, where the cathode comprises a coating of the intercalation material, the intercalation material can be deposited on a substrate (e.g., the electrolyte membrane, a cathode substrate, etc.) in any suitable number of layers, including, without limitation, 1, 2, 3, 4, 5, 6, 7, 8, 9, 10, or more.

Although, in some embodiments in which the cathode 30 comprises an intercalation material, the intercalation material includes an alkali metal (e.g., Na or Li) when the material is deposited on a substrate of the catholyte compartment 25 (e.g., the second side 60 of the electrolyte membrane 35, a cathode substrate, etc.), in other embodiments, the base material (e.g., nickel oxide, manganese oxide, iron phosphate, etc.) of the intercalation material is first coated on the substrate and the alkali metal is then loaded into and/or onto the base material. While this loading can be accomplished in any suitable manner, in some non-limiting embodiments, the loading occurs before the cathode is added to the cell 10, prior to operation of the cell, and/or as the cell operates.

Where the cathode 30 comprises a coating of the intercalation material, the coating of the intercalation material (e.g., on the electrolyte membrane 35, cathode substrate, etc.) can be any suitable thickness that allows the cell 10 to function. Indeed, in some embodiments, the intercalation material of the cathode is as thin as a measurement selected from about 50 µm, about 25 µm, about 10 µm, about 5 µm, and about 1 µm. In some embodiments, however, the intercalation material of the cathode is as thick as a measurement selected from about 55 µm, about 100 µm, about 500 µm, about 1 mm, about 5 mm, and about 1 cm. In still other embodiments, the intercalation material of the cathode has a thickness between any suitable combination or sub-range of the aforementioned measurements (e.g., between about 250 µm and about 520 µm or between about 10 µm and about 5 mm).

In addition to the cathode 30, in some embodiments (as shown in FIG. 4), the catholyte compartment 25 comprises a catholyte solution 65 (or catholyte material). In this regard, the catholyte solution can comprise any suitable chemical or chemicals that allow the cell 10 to carry out a desired chemical reaction. Some examples of suitable materials in the catholyte solution 65 include, but are not limited to, molten sodium, sodium hydroxide, glycerol, water, methanol, borax, sodium tetraborate decahydrate, sodium metaborate tetrahydrate, sodium silicate, boric acid, sodium borohydride, sodium phosphate, sodium hydrogen phosphate, sodium glycerol, sodium carbonate, ethylene, propylene, an ionic liquid (e.g., N-methoxyethyl-N-methyl-pyrrolidinium, butylmethyl-pyrrolidinium, propylmethyl-pyrrolidinium, triethyl-sulfonium, diethylmethylsulfonium, ethyl-dimethyl-ammonio-(trimethylammonio)-dihydroborate, pyridinium, pyrrolidinium, quaternary ammonium, quaternary phosphonium, trisulfonium, and sulfonium compounds, etc.), another suitable liquid, and any suitable combination of the foregoing.

With reference now to the terminals 40 and 45 (shown in FIG. 4), the cell 10 can comprise any suitable terminals that are capable of electrically connecting the cell with a power source (e.g., power source 70, shown in FIG. 4). In this regard, the terminals can comprise any suitable material and be any suitable shape and any suitable size. Additionally, the power supply can be any known or novel power supply that is capable of providing a suitable amount of voltage and current between the anode 20 and cathode 30 and that is otherwise suitable for use with an electrolytic cell.

In addition to the aforementioned components, the cell 10 can optionally comprise any other suitable component. In one example (not shown), the cell comprises one or more outlet and/or inlet channels to one or more of the compartments to allow materials to be added to and/or removed from the cell as it functions. In another example, FIG. 4 shows an embodiment in which the cell 10 optionally comprises a temperature management system 75. In such embodiments, the cell can comprise any suitable type of temperature management system that is capable of maintaining the cell within a suitable operating temperature range. Some examples of such temperature management systems include, but are not limited to, a heater, a cooler, one or more temperature sensors, and appropriate temperature control circuitry.

The described cell 10 can be modified in any suitable manner that allows it to perform a desired chemical reaction. In one example, both the anode 20 and the cathode 30 of some embodiments of the cell comprise an alkali metal intercalation material. In some such embodiments, the intercalation material used for the anode comprises a different material than is used for the cathode. In another example, some embodiments of the cell comprise an anode that includes an alkali metal intercalation material while the cathode comprises a conventional cathode material (instead of an intercalation material). In still another example, some embodiments of the cell comprise a cathode that includes an alkali metal intercalation material while the anode comprises a conventional anode material (as opposed to an intercalation material).

Turning now to the manner in which the described cell 10 functions, the cell can function in virtually any suitable manner. In one example, FIG. 4 illustrates that as the cell 10 functions and electrons (e$^-$) flow from the anode 20 (e.g., via the first terminal 40), an alkali metal M, such as Na or Li (e.g., from an alkali metal intercalation material present in the anode) is oxidized to form alkali ions (e.g., Na$^+$ or Li$^+$). FIG. 4 shows that these alkali ions (M$^+$) are then transported through the alkali ion conductive electrolyte membrane 35 and then to the catholyte compartment 25.

Figure 5:
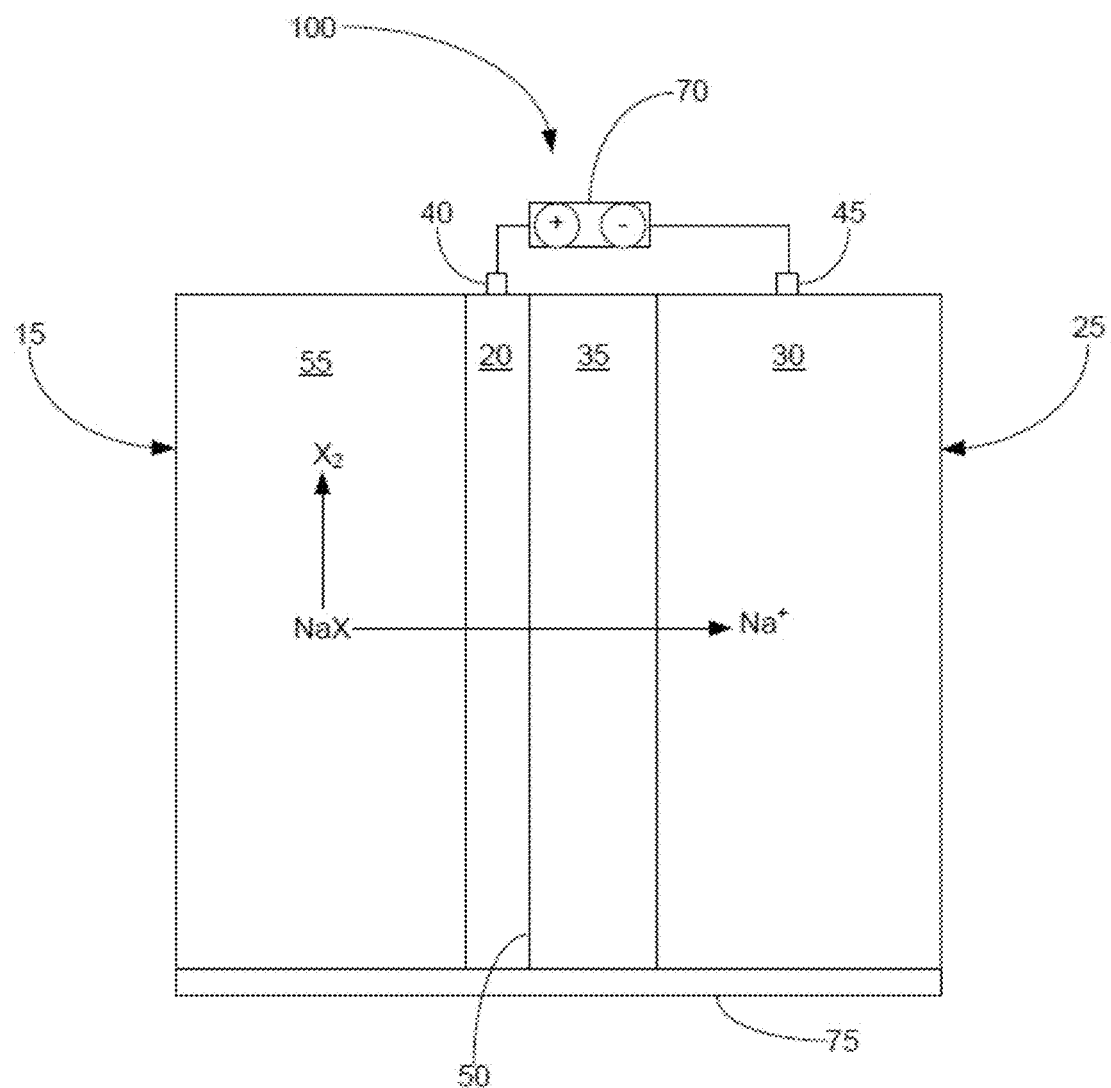
FIG. 5 depicts a schematic diagram of a representative embodiment of the cell, wherein the cell is used to generate molten sodium in its catholyte compartment.

In one non-limiting example of a method for operating the cell 10, FIG. 5 shows an embodiment in which a cell 100 is used in to synthesize molten sodium. While such a cell can comprise any suitable component, FIG. 5 shows an embodiment in which the cell 100 comprises: an anode 20 that includes an sodium intercalation compound that that is disposed on the first surface 50 of the electrolyte membrane 35 (e.g., a NaSICON type membrane); an anolyte solution 55 that includes a sodium containing compound (e.g., NaX, wherein X comprises an anion capable of combining with a sodium cation to form an ionic compound, wherein some examples of NaX may include NaS, Na$_2$S, NaI, NaCl, Na$_2$SO$_4$, NaNO$_3$, etc.); and a molten sodium cathode 30.

FIG. 5 shows that as the cell 100 operates and the sodium containing solution (e.g., NaX) is ionized by the anode 20, sodium cations (e.g., Na$^+$) are selectively transported to the catholyte compartment 25 where they combine with the molten sodium cathode 30 while the anion (e.g., S$^-$, I$^-$, Cl$^-$, etc.) forms a substance that precipitates (e.g., in the case of sulfur) or bubbles off (e.g., in the case iodine and chorine).

The described cell 10 may function at any suitable operating temperature. In other words, as current passes between the anode 20 and cathode 30, the anode may have any suitable temperature that allows the cell to function. Indeed, in some embodiments where an electrode comprises sodium, the cell functions at an operating temperature below about 100° C., and more particularly below 97° C., or below the melting point of sodium. In other embodiments where an electrode comprises lithium, the cell functions at an operating temperature below about 200° C., and more particularly below 181° C., or below the melting point of lithium.

In addition to the aforementioned advantages and characteristics of the described cell 10, the cell may have several other beneficial characteristics. Indeed, some embodiments of the cell 10 that comprise an electrode (e.g., the anode 20) that includes an intercalation material and that is coupled to the electrolyte membrane 35, can operate more efficiently (e.g., experience less voltage drop between the anode and the cathode 30) then occurs in some competing electrolytic cells. Additionally, some embodiments of the cell that comprise an electrode (e.g., an anode) that includes an intercalation material may be useful (as described above) for the synthesis of molten sodium and/or wide variety of other compounds.

In one embodiment, the cell is a secondary cell or rechargeable battery. As understood by persons skilled in the art, secondary cells can be discharged and recharged and this specification describes cell arrangements and methods for both states. Although the term "recharging" in its various forms implies a second charging, one of skill in the art will understand that discussions regarding recharging would be valid for, and applicable to, the first or initial charge, and vice versa. Thus, for the purposes of this specification, the terms "recharge," "recharged," and "rechargeable" shall be interchangeable with the terms "charge," "charged," and "chargeable," respectively.

Figure 6:
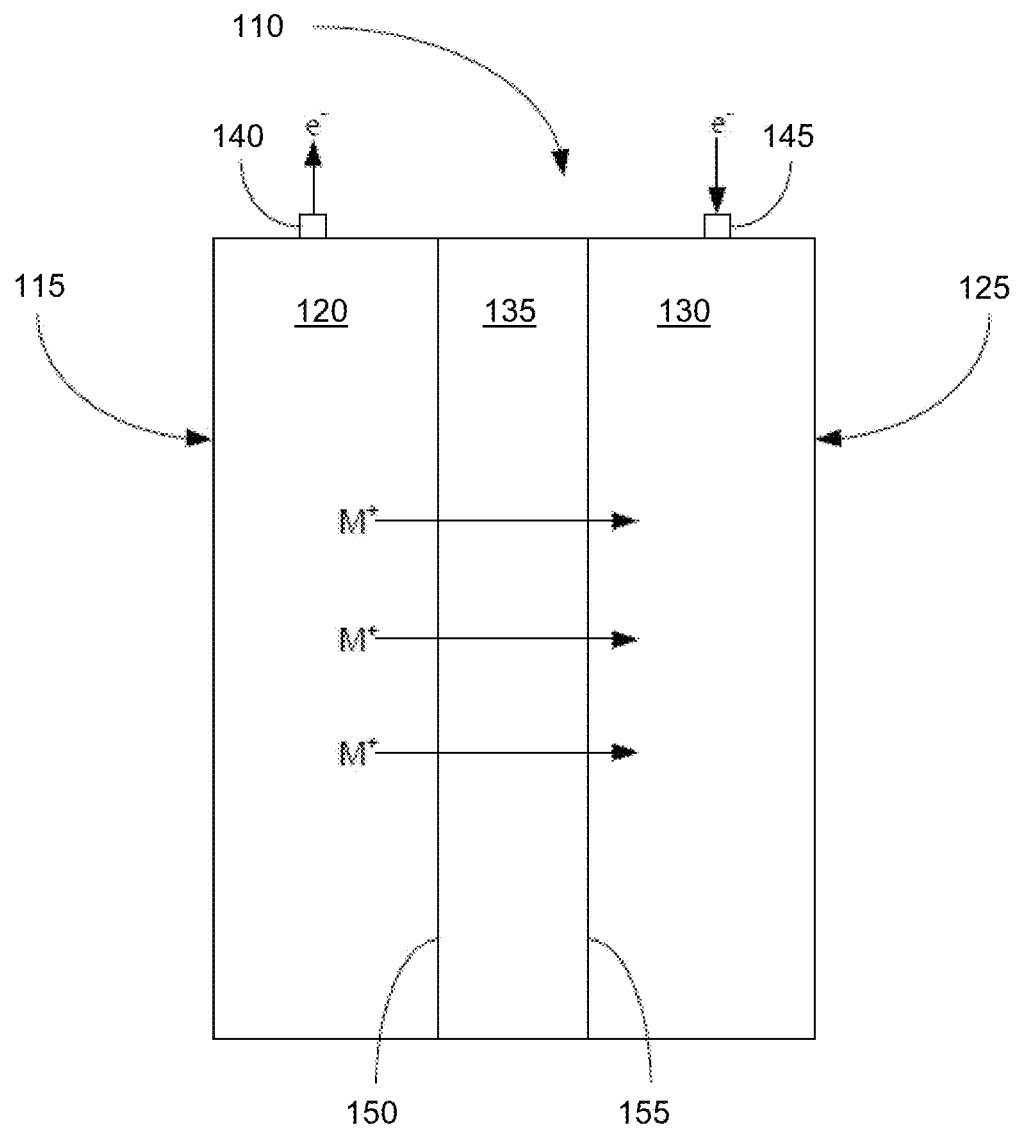
FIG. 6 depicts a schematic diagram of a representative embodiment of an alkali metal based secondary cell, wherein the cell comprises a negative electrode and a positive electrode that each include a different alkali metal intercalation material, and wherein the cell is in the process of being discharged.

Some disclosed embodiments provide an alkali metal based secondary cell that uses an alkali metal intercalation material as its negative electrode. While the described secondary cell can comprise any suitable component, FIG. 6 shows a representative embodiment in which the alkali metal based secondary cell 110 comprises an anolyte compartment 115, which includes a negative electrode 120 comprising a first alkali metal intercalation material; a catholyte compartment 125, which comprises a positive electrode 30; an alkali ion conductive electrolyte membrane 135 that separates the negative electrode 120 from the positive electrode 130; a first terminal 140; and a second terminal 145. To provide a better understanding of the described cell, a brief description of each of the cell's components shown in FIG. 6 is discussed below in more detail. Following this discussion, a brief description of how some embodiments of the cell function is provided.

Turning now to the various components of the cell 110, the cell (as mentioned above) can comprise an anolyte compartment 115 and a catholyte compartment 125. In this regard, the two compartments can be any suitable shape and have any other suitable characteristic that allows the cell 110 to function as intended. By way of example, the negative electrode compartment and the positive electrode compartment can each be tubular, rectangular, irregular, or can be any other suitable shape. Furthermore, the two compartments can have any suitable spatial relationship with respect to each other. By way of example, while FIG. 6 shows an embodiment in which the negative electrode compartment 115 and the positive electrode compartment 125 are adjacent to each other, in other embodiments (not shown), one compartment (e.g., the negative electrode compartment) is disposed (at least partially) within the other compartment (e.g., the positive electrode compartment), while the contents of the two compartments remain separated by the alkali ion conductive electrolyte membrane 135 and any other compartmental walls.

With respect to the negative electrode 120, the cell 110 can comprise any suitable negative electrode 120 that allows the cell to function (e.g., be discharged and/or recharged) as intended. One example of a suitable negative electrode material includes, but is not limited to, an alkali metal intercalation material. In this regard, the intercalation material can comprise any alkali metal containing material that allows the negative electrode to function as an electrode, that also allows alkali metal (e.g., Na or Li) in the negative electrode to be oxidized to form alkali ions (Na$^+$ or Li$^+$) as the cell is discharged, and that also allows alkali ions to be reduced and to intercalate with the intercalation material as the cell is recharged. In some embodiments, the intercalation material comprises a material that causes little to no increase in the resistance of the electrolyte membrane (discussed below). In other words, in some embodiments, the intercalation material readily transports alkali ions there through and has little to no adverse effect on the rate at which alkali ions pass from the negative electrode compartment 115 to the positive electrode compartment 125.

In some embodiments, the intercalation material in the negative electrode 120 comprises sodium metal intercalated with carbon (e.g., graphite, mesoporous carbon, boron-doped diamond, carbon, and/or graphene). Indeed, in some embodiments, the negative electrode 120 comprises Na$_x$C$_6$, Na$_x$Co$_2$O$_4$, and/or sodium intercalated into hard carbon, wherein x is between about 0 and about 3.

In other embodiments, the intercalation material in the negative electrode 120 comprises a lithium metal intercalated into and/or onto carbon (e.g., graphite, mesoporous carbon, boron-doped diamond, carbon, and/or graphene). Indeed, in some embodiments, the negative electrode comprises Li$_x$C$_6$, wherein x is between about 0 and about 3.

While the negative electrode 120 can have any spatial relationship with respect to the alkali ion conductive electrolyte membrane 135 (discussed below), in some embodiments, the negative electrode is disposed on or coupled to a first side 150 (as shown in FIG. 6) of the membrane that faces the negative electrode compartment 115. While having the intercalation material of the negative electrode be coupled to the electrolyte membrane may provide the cell 110 with several features, in some embodiments, by having the intercalation material be coupled to the electrolyte membrane, alkali ions (e.g., Na$^+$ or Li$^+$) can pass directly from the negative electrode and through the electrolyte membrane (e.g., as the cell is discharged) and directly from the electrolyte membrane, back to the negative electrode (e.g., as the cell is recharged).

Where the negative electrode 120 is coupled to the electrolyte membrane 135, the negative electrode can be coupled to the electrolyte membrane in any suitable manner. Indeed, in some embodiments, the intercalation material of the negative electrode 120 is disposed on the electrolyte membrane through a method such as chemical vapor deposition ("CVD"), physical vapor deposition ("PVD"), sputtering, casting, pulsed laser deposition, DC magnetron sputtering, and/or any other suitable technique that is capable of coupling the intercalation material of the negative electrode to the electrolyte membrane. Additionally, while the intercalation material can be added to the electrolyte membrane as a single layer, in some embodiments, 1, 2, 3, 4, 5, 6, 7, 8, 9, 10, or more layers of the intercalation material are added to the first side 50 of the electrolyte membrane.

Although, in some embodiments, the intercalation material of the negative electrode 120 comprises an alkali metal (e.g., Na or Li) when the material is coupled to the electrolyte membrane 135, in other embodiments, the base material (e.g., carbon) of the intercalation material is first coated on the electrolyte membrane and the alkali metal is then loaded into the base material. While this loading can be accomplished in any suitable manner, in some non-limiting embodiments, the loading occurs during fabrication of the negative electrode, prior to operation of the cell and/or as the cell operates.

Where the intercalation material of the negative electrode 120 is coupled to the electrolyte membrane 135, the intercalation material (as a whole) can be any suitable thickness that allows the cell 110 to function. Indeed, in some embodiments, the intercalation material of the negative electrode is as thin as a measurement selected from about 50 µm, about 25 µm, about 10 µm, and about 5 µm, and about 1 µm. In some embodiments, however, the intercalation material of the negative electrode is as thick as a measurement selected from about 55 µm, about 100 µm, about 500 µm, about 1 mm, about 5 mm, and about 1 cm. In still other embodiments, the thickness of the intercalation material of the negative electrode is between any suitable combination or sub-range of the aforementioned measurements (e.g., between about 250 µm and about 500 µm).

In some embodiments, in addition to the negative electrode 120, the negative electrode compartment 115 further comprises a negative electrolyte solution. The negative electrolyte solution can comprise any suitable chemical or chemicals that allow the cell 110 to function.

As previously mentioned, the cell 110 also comprises a solid alkali ion selective electrolyte membrane 135. In this regard, the alkali ion conductive electrolyte membrane 135 material may include, but is not limited to, a β"-alumina ceramic electrolyte separator, and an alkali Metal Super Ion Conductive (MeSICON) material, where "Me" represents an alkali metal. Some examples of MeSICON materials include, but are not limited to, ceramic NaSICON-type materials (including, without limitation, any suitable known or novel NaSICON material) and LiSICON-type materials (including, without limitation, any suitable known or novel LiSICON material). In some embodiments in which the negative electrode 120 comprises an intercalation material that contains sodium (e.g., $Na_xC_6$, wherein x is between about 0 and about 3), the electrolyte membrane comprises a NaSICON-type material. In contrast, in some embodiments in which the negative electrode comprises an intercalation material that contains lithium (e.g., $Li_xC_6$), the electrolyte membrane comprises a LiSICON-type material.

With regards now to the positive electrode 130, the cell 110 can comprise any suitable positive electrode 130 that allows the cell to be charged and discharged as intended. Some examples of suitable positive electrodes include, but are not limited to, a second alkali metal intercalation material that is coupled to a second side 155 (as shown in FIG. 6) of the electrolyte membrane 135 and an electrode material that is separated from the electrolyte membrane.

In embodiments in which the positive electrode 130 comprises a second alkali metal intercalation material that is coupled to the second side 155 of the electrolyte membrane 135, the positive electrode can comprise any suitable intercalation material that allows the cell to function and that is different (e.g., has a different potential) than the first intercalation material that is used in the negative electrode 120. Accordingly, in some embodiments, the described cell 110 comprises a solid state rechargeable battery.

In some embodiments, in which the negative electrode 120 comprises a sodium intercalation material (e.g., $Na_xC_6$), the second intercalation material used in the positive electrode 130 also comprises sodium. In this regard, some examples of suitable sodium intercalation materials that can be used in the positive electrode include, but are not limited to, $Na_xNiO$, $Na_xMnO_2$, $Na_xNiO_2$, $Na_xAlO_2$, $Na_xCoO_2$ (wherein x is between about 0.2 and about 1) and/or $Na_xFe_y(PO_4)_z$ (wherein x is between about 0 and about 3, y is about 1 and z is between about 1 and about 3). Indeed, in some embodiments in which the negative electrode comprises $Na_xC_6$, the positive electrode comprises $Na_xMnO_2$.

In some embodiments in which the negative electrode 120 comprises a lithium intercalation material (e.g., $Li_xC_6$), the positive electrode 130 comprises a second lithium intercalation material, which is different than the first. Indeed, in some embodiments in which the negative electrode comprises a lithium intercalation material (e.g., $Li_xC_6$), the positive electrode comprises $Li_xNiO$, $Li_xMnO_2$, $Li_xCoO_2$, $Li_xMn_2O_4$ (wherein x is between about 0.2 and about 1) and/or $Li_xFe_y(PO_4)_z$ (wherein x is between about 0 and about 3, y is about 1 and z is between about 1 and about 3). Indeed, in some embodiments in which the negative electrode comprises $Li_xC_6$, the positive electrode comprises $Li_xMnO_2$.

Where the positive electrode 130 comprises the second alkali metal intercalation material, and where such material is coupled to the second side 155 of the electrolyte membrane 135, the positive electrode can be coupled to the electrolyte membrane in any suitable manner. Indeed, in some embodiments, the intercalation material of the positive electrode 130 is disposed on the electrolyte membrane through one or more of the methods that are used to couple the first intercalation material of the negative electrode 120 to the first side 150 of the electrolyte membrane (e.g., via CVD, PVD, sputtering, casting, etc.). Moreover, the second intercalation material can be deposited on the second side of the electrolyte membrane in any suitable number of layers, including, without limitation, 1, 2, 3, 4, 5, 6, 7, 8, 9, 10, or more.

Although in some embodiments, the intercalation material of the positive electrode 130 comprises an alkali metal (e.g., Na or Li) when the material is coupled to the second side 155 of the electrolyte membrane 135, in other embodiments, the base material (e.g., nickel oxide, manganese oxide, iron phosphate, etc.) of the second intercalation material is first coated on the electrolyte membrane and the alkali metal is then loaded into and/or onto the base material. While this loading can be accomplished in any suitable manner, in some non-limiting embodiments, the loading occurs during fabrication of the positive electrode, prior to operation of the cell and/or as the cell operates.

Where the second intercalation material of the positive electrode 130 is coupled to the electrolyte membrane 135, the second intercalation material can be any suitable thickness that allows the cell 110 to function. Indeed, in some embodiments, the intercalation material of the positive electrode is as thin as a measurement selected from about 50 µm, about 25 µm, about 10 µm, and about 5 µm, and about 1 µm.

In some embodiments, however, the intercalation material of the positive electrode is as thick as a measurement selected from about 55 µm, about 100 µm, about 500 µm, about 1 mm, and about 5 mm, and about 1 cm. In still other embodiments, the second intercalation material of the positive electrode has a thickness between any suitable combination or sub-range of the aforementioned measurements (e.g., between about 250 µm and about 500 µm or between about 10 µm and about 5 mm).

In some embodiments, instead of using a second alkali metal intercalation material as the positive electrode 130, the described cell can comprise virtually any other known or novel positive electrode material that allows the battery to be discharged and charged. Indeed, in some embodiments, the positive electrode comprises a wire, felt, plate, tube, mesh, foam, and/or other suitable positive electrode configuration in which the positive electrode is separated from the electrolyte membrane 135. Furthermore, in some embodiments, the positive electrode comprises a material selected from, but not limited to, a nickel foam, a sodium composite that is not molten at the cell's operating temperature (including, without limitation, a sodium/sulfur material), nickel hydroxide $(Ni(OH)_2)$ (e.g., when the cell is at least partially discharged), nickel oxyhydroxide (NiOOH) (e.g., when the cell is at least partially charged), and/or another suitable material.

Figure 8:
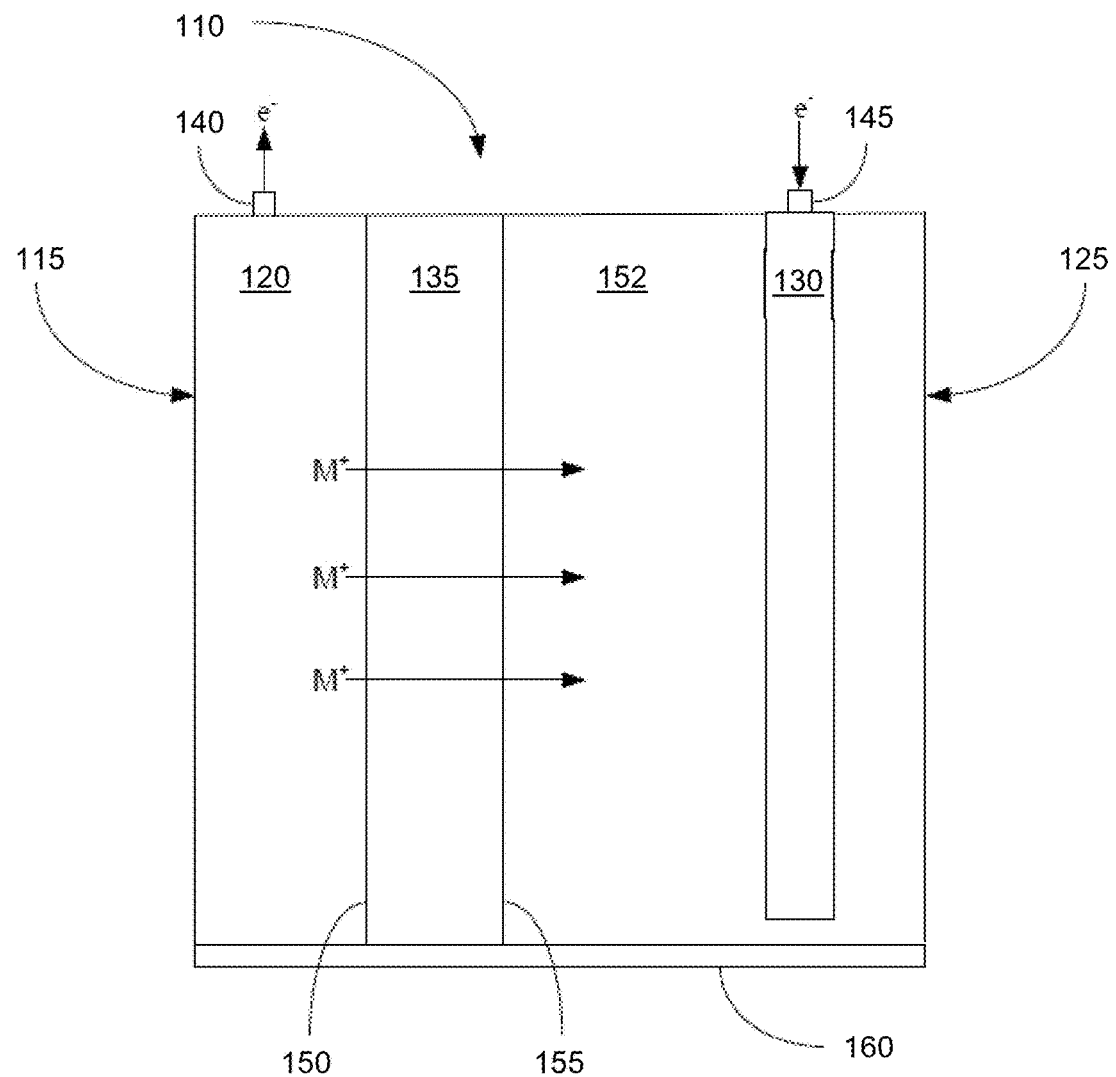
FIG. 8 depicts a schematic diagram of a representative embodiment of the secondary cell, wherein the cell comprises a positive electrode that is separated from an alkali ion conductive electrolyte membrane, and wherein the cell is in the process of being discharged.

According to some embodiments in which the positive electrode 130 does not comprise the second intercalation material, FIG. 8 shows the positive electrode compartment 125 comprises a positive electrolyte solution 152. In such embodiments, the positive electrolyte can comprise any suitable alkali ion conductive material that allows the cell 110 to function as intended. Some examples of suitable materials in the positive electrolyte solution 152 include, but are not limited to, sodium hydroxide, glycerol, water, borax, sodium tetraborate decahydrate, sodium metaborate tetrahydrate, sodium silicate, boric acid, sodium borohydride, sodium phosphate, sodium hydrogen phosphate, sodium glycerol, sodium carbonate, ethylene, propylene, an ionic liquid (e.g., N-methoxyethyl-N-methyl-pyrrolidinium, butylmethyl-pyrrolidinium, propylmethyl-pyrrolidinium, triethyl-sulfonium, diethylmethylsulfonium, ethyl-dimethyl-ammonio-(trimethylammonio)-dihydroborate, pyridinium, pyrrolidinium, quaternary ammonium, quaternary phosphonium, trisulfonium, and sulfonium compounds, etc.), another suitable liquid, and any suitable combination of the foregoing.

With reference now to the terminals 140 and 145 (shown in FIG. 8), the cell 10 can comprise any suitable terminals that are capable of electrically connecting the cell with an external circuit, including, without limitation, to one or more other cells. In this regard, the terminals can comprise any suitable material and any suitable shape of any suitable size.

In addition to the aforementioned components, the cell 110 can optionally comprise any other suitable component. By way of non-limiting illustration, FIG. 8 shows an embodiment in which the cell 110 optionally comprises a temperature management system 160. In such embodiments, the cell can comprise any suitable type of temperature management system that is capable of maintaining the cell within a suitable operating temperature range. Some examples of such temperature management systems include, but are not limited to, a heater, a cooler, one or more temperature sensors, and appropriate temperature control circuitry.

Figure 9:
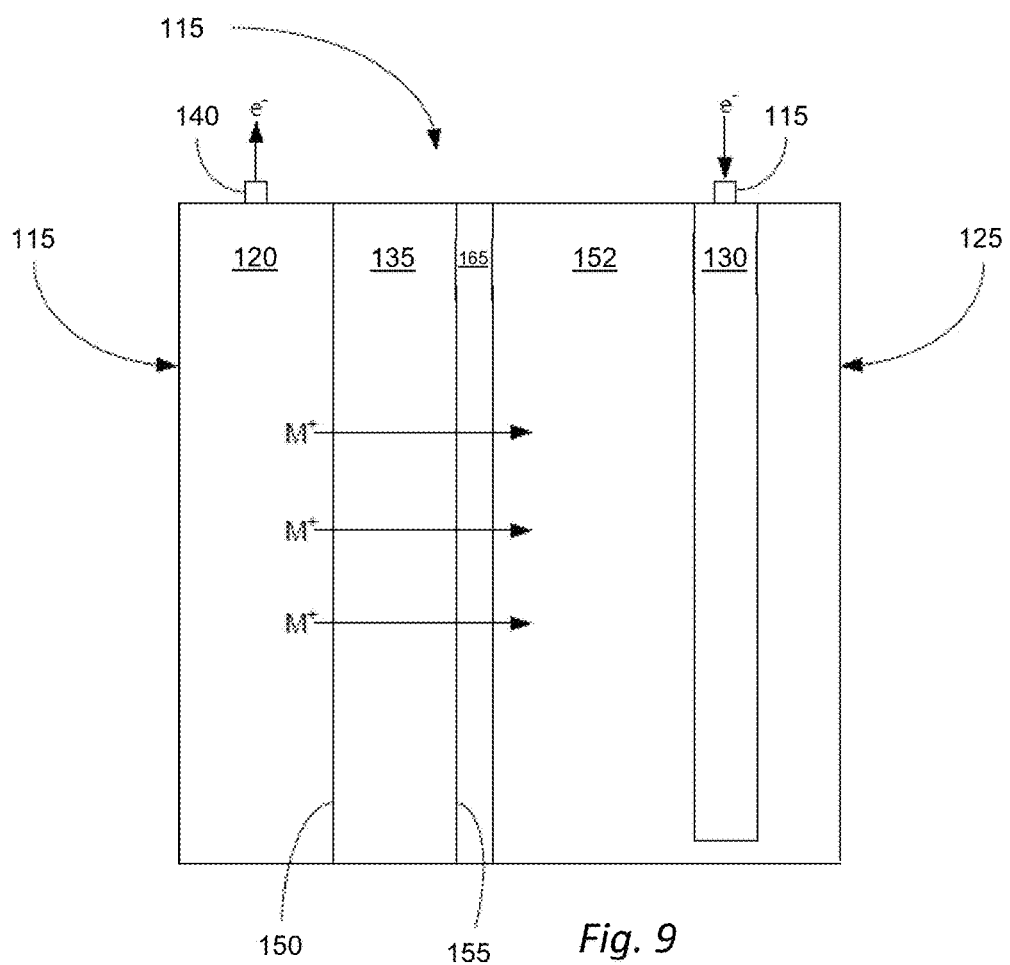
FIG. 9 depicts a schematic diagram of a representative embodiment of the secondary cell, wherein the cell comprises a coating that is coupled to the cell's electrolyte membrane, and wherein the cell is in the process of being discharged.

The described cell 110 can be modified in any suitable manner that allows it to be charged and discharged. In one example of such a modification, FIG. 9 shows some embodiments in which a coating layer 165 is disposed on the second side 155 of the electrolyte membrane 135. In this example, the coating layer can perform any suitable function, including, without limitation, protecting the electrolyte membrane 135 from the components (e.g., basic materials) of the positive electrolyte solution 152, and otherwise increasing the membrane's operable life. While the coating layer can comprise any suitable material, in some embodiments, the coating layer comprises carbon, an intercalation material (e.g., $Na_xNiO$, $Na_xMnO_2$, $Na_xFe_y(PO_4)_z$, $Na_xNiO_2$, $Na_xAlO_2$, $Na_xCoO_2$, $Li_xNiO$, $Li_xMnO_2$, $Li_xCoO_2$, $Li_xMn_2O_4$, and $Li_xFe_y(PO_4)_z$), nickel oxide, manganese oxide, iron phosphate, or combinations thereof). Indeed, in some embodiments, the protective layer comprises carbon.

Where the cell 110 comprises coating layer 165 on the second side 155 of the electrolyte membrane 135, the coating layer can be any suitable thickness that allows the cell to function as intended. Indeed, in some embodiments, the coating layer is as thin as a measurement selected from about 50 µm, about 25 µm, about 10 µm, about 5 µm, and about 1 µm. In some embodiments, however, the coating layer is as thick as a measurement selected from about 55 µm, about 100 µm, about 500 µm, about 1 mm, about 5 mm, and about 1 cm. In still other embodiments, the coating layer has a thickness between any suitable combination or sub-range of the aforementioned measurements (e.g., between about 250 µm and about 500 µm or between about 10 µm and about 5 mm).

Turning now to the manner in which the described secondary cell 110 functions, the cell can function in virtually any suitable manner. In one example, FIG. 6 illustrates that as the cell 110 is discharged and electrons ($e^-$) flow from the negative electrode 120 (e.g., via the first terminal 140), an alkali metal M, such as Na or Li, in the negative electrode is oxidized to form alkali ions (e.g., $Na^+$ or $Li^+$). FIG. 6 shows that these alkali ions ($M^+$) are transported from the negative electrode 120, through the alkali ion conductive electrolyte membrane 135, and then to the positive electrode compartment 125 (e.g., into the positive electrode 130 and/or the positive electrolyte solution 152). For instance, in some embodiments in which the cell comprises a negative electrode comprising $Na_xC_6$ and a positive electrode comprising $Na_xMnO_2$, the negative electrode gives sodium ions to the positive electrode as the cell discharges.

Figure 7:
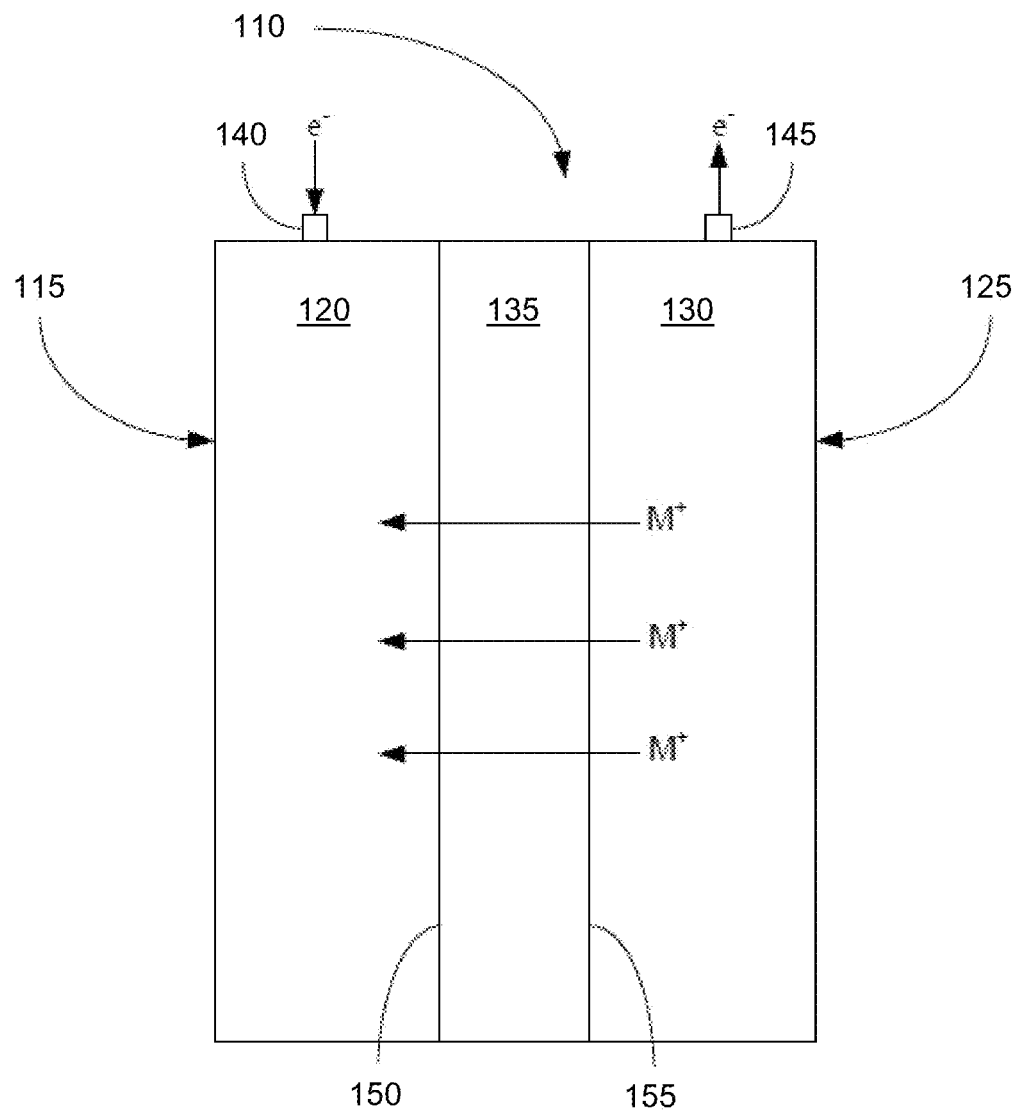
FIG. 7 depicts a schematic diagram of a representative embodiment of the secondary cell of FIG. 1, wherein the cell is in the process of being recharged.

In a contrasting example, FIG. 7 shows that as the described secondary cell 110 is recharged and electrons ($e^-$) flow into the negative electrode 120 (e.g., via the first terminal 140) from an external power source (not shown), such as a recharger, the chemical reactions that occurred when the cell was discharged (as shown in FIG. 6) are reversed. Specifically, FIG. 7 shows that as the cell 110 is recharged, alkali ions ($Na^+$ or $Li^+$) are transported from the positive electrode compartment 125 (e.g., from the positive electrode 130), through the alkali ion conductive electrolyte membrane 135, and to the negative electrode 120, where the alkali ions are reduced and intercalated back into or onto the negative electrode 120. For instance, in some embodiments in which the cell comprises a negative electrode comprising $Na_xC_6$ and a positive electrode comprising $Na_xMnO_2$, the positive electrode gives sodium ions to the negative electrode as the cell recharges.

In one non-limiting example, the positive electrode 30 half-reaction for the cell 110 (with charging being forward) is: $LiCoO_2 \leftrightarrow Li_{1-n}CoO_2 + nLi^+ + ne^-$, wherein the negative electrode 120 half-reaction is $nLi^+ + ne^- + C \leftrightarrow Li_nC$.

The described cell 110 may function at any suitable operating temperature. In other words, as the cell is discharged and/or recharged, the negative electrode 120 may have any suitable temperature that allows it to remain solid. Indeed, in some embodiments where an electrode comprises sodium, the cell functions at an operating temperature below about 100° C., and more particularly below 97° C., or below the melting point of sodium. In other embodiments where an electrode comprises lithium, the cell functions at an operating temperature below about 200° C., and more particularly below 181° C., or below the melting point of lithium.

In addition to the aforementioned advantages and characteristics of the described cell 10, the cell may have several other beneficial characteristics. In one example, as the negative electrode 120 comprises an alkali metal intercalation material (e.g., $Na_xC_6$ or $Li_xC_6$) that is solid as the cell functions, some embodiments of cell function at relatively low temperatures. As a result, such embodiments of the cell may require little to no energy to heat and/or dissipate heat from the cell as the cell functions. Additionally, because the cell can operate at a lower temperature than certain conventional rechargeable batteries that comprise a molten negative electrode, the cell may be less dangerous to use or handle. In still another example, because some embodiments of the cell may be recharged multiple times, do not release hazardous chemicals as it functions, and require less thermal energy than some conventional batteries, such embodiments of the cell may be relatively environmentally friendly.

The following examples are given to illustrate the functionality of the electrolyte membrane 35 when the membrane is coated with a layer of carbon, which may serve (or be modified to serve) as an intercalation material. These examples are given by way of illustration only, and it is understood that the following examples are not comprehensive or exhaustive of the many types of embodiments of the present invention that can be prepared in accordance with the present invention.

EXAMPLE 1

In this example, an electrolytic cell (e.g., a rechargeable battery) 200 was constructed to include components similar to those in FIG. 10. Specifically, the cell 10 was constructed to include an anolyte compartment 205 housing a nickel wire anode 210 that is in contact with negative electrolyte solution 215 containing ethylene glycol and NaI at a 38% concentration, by weight. Moreover, the cell was constructed to include a cathode compartment 220 housing a nickel oxyhydroxide cathode 225 disposed in a positive electrolyte solution 230 comprising an aqueous solution that includes borax at a 30% concentration, by weight. Additionally, FIG. 10 shows that cell 200 further comprises a NaSICON membrane 235 comprising a layer of carbon 240 facing the cathode 225. Also, FIG. 10 shows that the cell 200 includes a first terminal 245, a second terminal 250, and a platinum reference 255.

Figure 11:
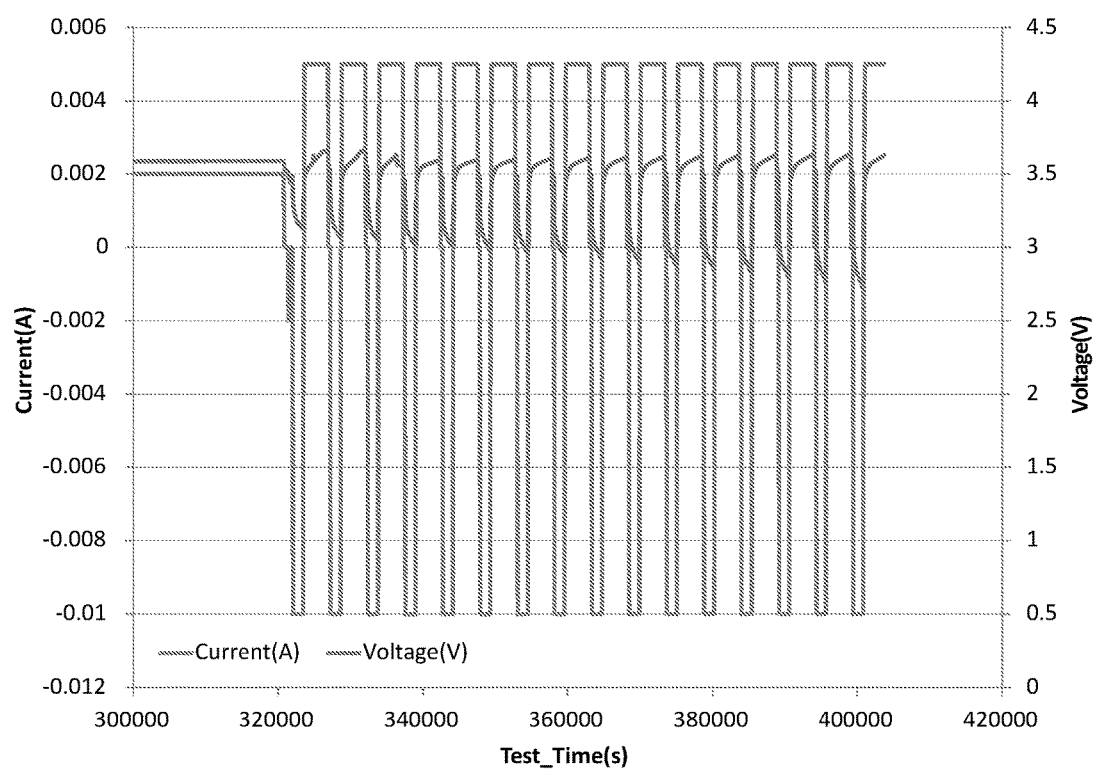
FIG. 11 depicts a graph illustrating the stability of a layer of carbon coating on a NaSICON membrane according to a representative embodiment of the invention.

The graph in FIG. 11 shows that when the cell 200 was charged and discharged at 90° C. over a period of three weeks, the carbon layer 240 substantially maintained its stability in the borax solution 230.

FIG. 12 further shows that when the operation of the cell 200 of FIG. 10 was compared (via electrochemical impedance spectroscopy, "EIS") to the cell 300 of FIG. 13 (which has the same setup of the cell 200 in FIG. 10, but lacks the carbon layer 240), the cell 200 of FIG. 10 with the carbon layer 240 did not have a higher resistance than the cell 300 of FIG. 13, which lacked the carbon layer. In this regard, line 305 represents the EIS measurements of the electrode in the cell 300 with the uncoated NaSICON 235, line 310 represents the EIS measurements of the electrode and membrane 235 in the cell 300 with the uncoated NaSICON 235, line 315 represents the EIS measurements of the electrode in the cell 200 with the coated NaSICON 235, and line 320 represents the EIS measurements of the electrode and membrane 235 in the cell 200 with the uncoated NaSICON 235. Accordingly, FIG. 12 shows that, contrary to expectations, the carbon coating 240 in the cell 200 had little to no adverse effect on the cell's function. Accordingly, it is theorized that an electrode (e.g., an anode 20 and/or cathode 30) that comprises an alkali metal intercalation material having a base material (e.g., carbon) will have little to no adverse effect on the cell's function.

While specific embodiments and examples of the present invention have been illustrated and described, numerous modifications come to mind without significantly departing from the spirit of the invention, and the scope of protection is only limited by the scope of the accompanying claims.

The invention claimed is:

1. A solid state alkali metal based secondary cell, comprising:
   a negative electrode compartment comprising a negative electrode, wherein the negative electrode consists of a carbon-based first alkali metal intercalation material comprising $M_xC_6$, wherein M is Na or Li and x≤3;
   a positive electrode compartment comprising a positive electrode, wherein the positive electrode consists of a second alkali metal intercalation material that is different than the first alkali metal intercalation material; and
   a solid alkali metal ion conductive ceramic electrolyte membrane that separates the negative electrode from the positive electrode, wherein the negative electrode is in direct contact with a first side of the electrolyte membrane, wherein the positive electrode is in direct contact with a second side of the electrolyte membrane that is substantially opposite to the first side, and wherein the electrolyte membrane is selected from the group consisting of a sodium ion conductive ceramic NaSICON-type material and a lithium ion ceramic LiSICON-type material.

2. The secondary cell of claim 1, wherein the $M_xC_6$ is $Na_xC_6$, wherein x≤3.

3. The secondary cell of claim 1, wherein the $M_xC_6$ is $Li_xC_6$, wherein x≤3.

4. The secondary cell of claim 1, wherein the second alkali metal intercalation material is selected from $Na_xNiO$, $Na_xMnO_2$, $Na_xNiO_2$, $Na_xAlO_2$, $Na_xCoO_2$, and $Na_xFePO_4$, wherein 0.2≤x≤1.

5. The secondary cell of claim 1, wherein:
   the negative electrode compartment consists of the negative electrode and a negative terminal; and
   the positive electrode compartment consists of the positive electrode and a positive terminal.

6. The secondary cell of claim 5, wherein the $M_xC_6$ is $Na_xC_6$, wherein x≤3.

7. The secondary cell of claim 5, wherein the $M_xC_6$ is $Li_xC_6$, wherein x≤3.

8. The secondary cell of claim 5, wherein the second alkali metal intercalation material is selected from $Na_xNiO$, $Na_xMnO_2$, $Na_xNiO_2$, $Na_xAlO_2$, $Na_xCoO_2$, and $Na_xFePO_4$, wherein 0.2≤x≤1.

9. A solid state alkali metal based secondary cell, comprising:
   a negative electrode compartment comprising a negative electrode, wherein the negative electrode consists of a carbon-based first alkali metal intercalation material comprising $M_xC_6$, wherein M is Na or Li and $x \leq 3$;

a positive electrode compartment comprising a positive electrode, wherein the positive electrode consists of a second alkali metal intercalation material that is different than the first alkali metal intercalation material; and a solid alkali metal ion conductive ceramic electrolyte membrane that separates the negative electrode from the positive electrode, wherein the negative electrode directly contacts a first side of the electrolyte membrane, wherein a carbon coating layer is disposed on a second side of the electrolyte membrane, opposite to the first side, wherein the positive electrode directly contacts the carbon coating layer, and wherein the electrolyte membrane is selected from the group consisting of a sodium ion conductive ceramic NaSICON-type material and a lithium ion ceramic LiSICON-type material.

10. The secondary cell of claim 9, wherein the $M_xC_6$ is $Na_xC_6$, wherein $x \leq 3$.

11. The secondary cell of claim 9, wherein the $M_xC_6$ is $Li_xC_6$, wherein $x \leq 3$.

12. The secondary cell of claim 9, wherein the second alkali metal intercalation material is selected from $Na_xNiO$, $Na_xMnO_2$, $Na_xNiO_2$, $Na_xAlO_2$, $Na_xCoO2$, and $Na_xFePO_4$, wherein $0.2 \leq x \leq 1$.

13. A solid state alkali metal based secondary cell, comprising:

a negative electrode compartment comprising a negative electrode, wherein the negative electrode consists of a carbon-based first alkali metal intercalation material;

a positive electrode compartment comprising a positive electrode, wherein the positive electrode consists of a second alkali metal intercalation material that is different than the first alkali metal intercalation material and is selected from $Na_xNiO$, $Na_xMnO_2$, $Na_xNiO_2$, $NaxAlO_2$, $Na_xCoO_2$, and $Na_xFePO_4$, wherein $0.2 \leq x \leq 1$; and a solid alkali metal ion conductive ceramic electrolyte membrane that separates the negative electrode from the positive electrode, wherein the negative electrode is in direct contact with a first side of the electrolyte membrane, wherein the positive electrode is in direct contact with a second side of the electrolyte membrane that is substantially opposite to the first side, and wherein the electrolyte membrane is selected from the group consisting of a sodium ion conductive ceramic NaSICON-type material and a lithium ion ceramic LiSICON-type material.

14. The secondary cell of claim 13, wherein the carbon-based first alkali metal intercalation material is $Na_xC_6$, wherein $x \leq 3$.

15. The secondary cell of claim 13, wherein the carbon-based first alkali metal intercalation material is $Li_xC_6$, wherein $x \leq 3$.

16. The secondary cell of claim 13, wherein:

the negative electrode compartment consists of the negative electrode and a negative terminal; and the positive electrode compartment consists of the positive electrode and a positive terminal.

17. The secondary cell of claim 16, wherein the carbon-based first alkali metal intercalation material is $Li_xC_6$, wherein $x \leq 3$.

* * * * *